US006937553B1

(12) United States Patent
Mitui et al.

(10) Patent No.: US 6,937,553 B1
(45) Date of Patent: Aug. 30, 2005

(54) RECORDER FOR RECORDING COPY OF PRODUCTION ON THE BASIS OF COPY ATTRIBUTE EMBEDDED AS ELECTRONIC WATERMARK IN THE PRODUCTION, REPRODUCING DEVICE FOR REPRODUCING RECORDED COPY, RECORDED MEDIUM, RECORDING METHOD, AND REPRODUCING METHOD

(75) Inventors: Yoshitaka Mitui, Ibaraki (JP); Hideshi Ishihara, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/914,129

(22) PCT Filed: Feb. 23, 2000

(86) PCT No.: PCT/JP00/01013

§ 371 (c)(1),
(2), (4) Date: Aug. 23, 2001

(87) PCT Pub. No.: WO00/52691

PCT Pub. Date: Sep. 8, 2000

(30) Foreign Application Priority Data

Feb. 26, 1999 (JP) ................................ 11-050892

(51) Int. Cl.[7] .............................................. G11B 7/00
(52) U.S. Cl. ..................................... 369/84; 369/53.21
(58) Field of Search ......................... 369/53.21, 53.22, 369/84, 275.3, 53.1, 53.2

(56) References Cited

U.S. PATENT DOCUMENTS 6,266,299 B1 * 7/2001 Oshima et al. .......... 369/13.38
6,279,959 B1 * 8/2001 Nishizawa ................... 283/67
6,608,804 B2 * 8/2003 Shim ........................ 369/53.22
6,707,774 B1 * 3/2004 Kuroda et al. ........... 369/53.21

FOREIGN PATENT DOCUMENTS

| EP | 0 859 503 | 8/1998 |
| JP | 8-339629 | 12/1996 |
| JP | 9-163306 | 6/1997 |
| JP | 10-191247 | 7/1998 |
| JP | 11-328846 | 11/1999 |
| JP | 11-339373 | 12/1999 |
| JP | 2000-149414 | 5/2000 |

* cited by examiner

Primary Examiner—Nabil Hindi
(74) Attorney, Agent, or Firm—Wenderoth, Lind & Ponack, L.L.P.

(57) ABSTRACT

A recording apparatus for recording a duplicate of a product onto a recording medium, the product being a copyrighted digital product having a copy attribute embedded as a watermark thereon and the recording apparatus including (a) an acquiring unit for acquiring the copy attribute embedded on the product, (b) a changing unit for changing the acquired copy attribute into a copy attribute showing no more copy when the acquired copy attribute shows one generation copy, (c) a reading unit for reading from the recording medium at least a part of medium ID information recorded on the recording medium in an unalterable state, and (d) a recording unit for recording onto the recording medium the duplicate having both the copy attribute showing no more copy and the read medium ID information embedded as a watermark thereon.

12 Claims, 24 Drawing Sheets

Fig.7B
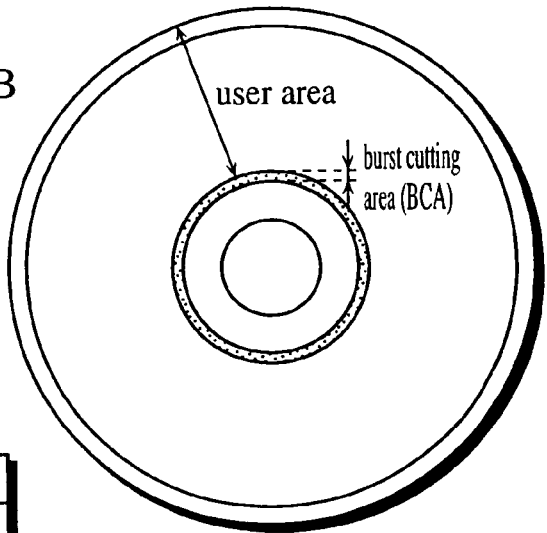
Fig.7A
| copy attribute | |
|---|---|
| copy free | 00 |
| one generation copy | 10 |
| no more copy | 11 |
| never copy | 01 |
Fig.7C
Copyrighted Digital Product
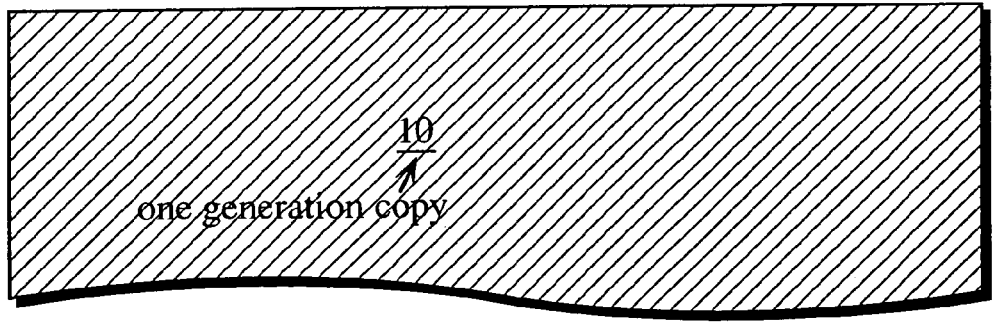
Fig.7D
Duplicate
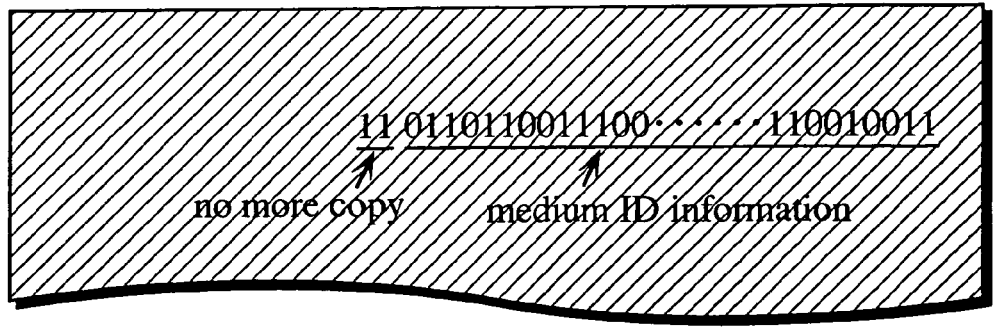

Fig.11A
| ○ area code | | |
|---|---|---|
| 000 : United States | 001 : Japan/Europe | 010 : South Asia |
| 011 : Latin America | 100 : Asia/Africa | 101 : China |
| 110 : Reserved | 111 : Special Area (plane, boat, etc) | |
Fig.11B
Copyrighted Digital Product
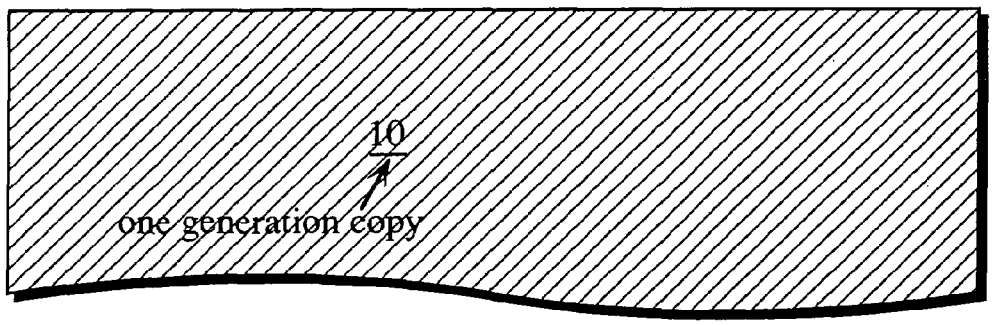
one generation copy
Fig.11C
Duplicate
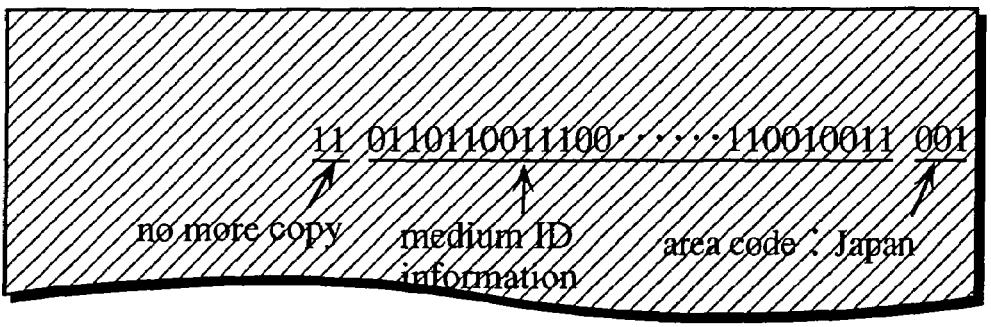
no more copy / medium ID information / area code : Japan

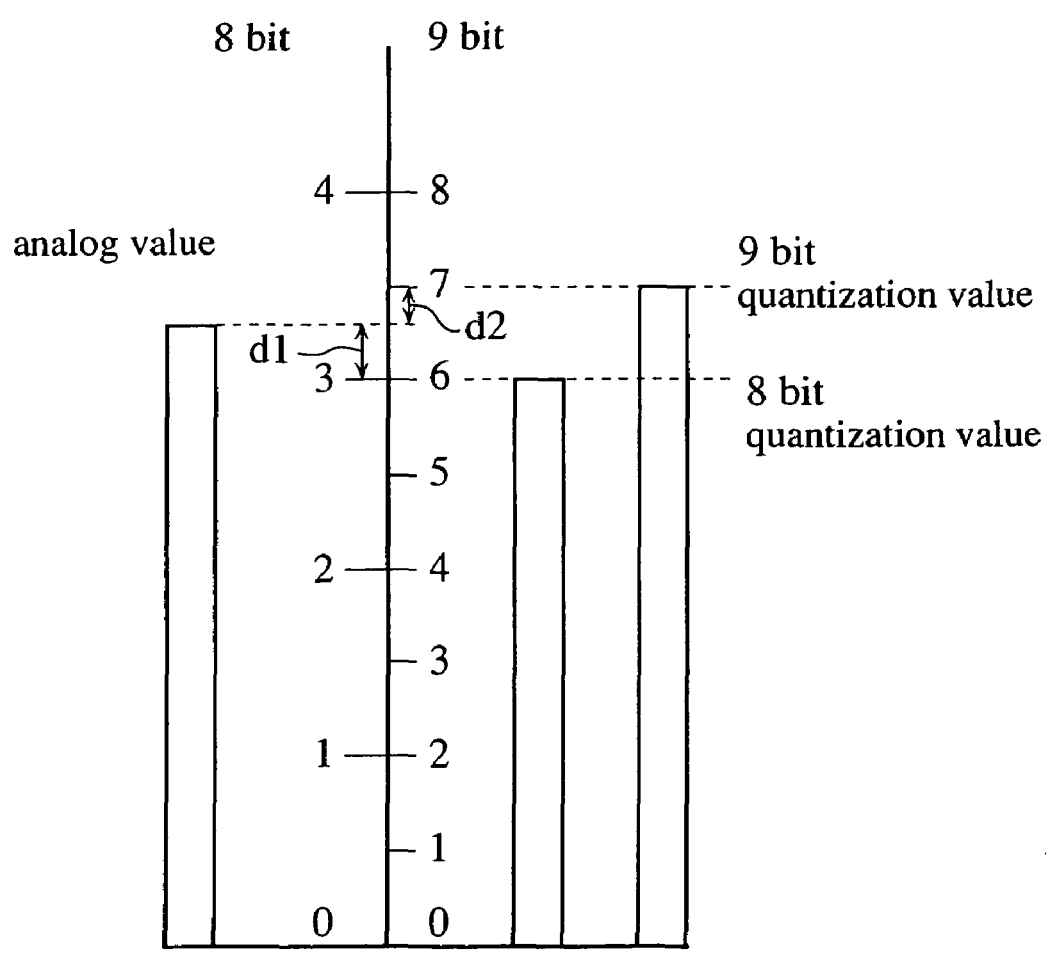

Fig.18A reproduction quality information for digital sound data

| sampling frequency information | 001 : 48kHz   010 : 96kHz   011 : 192kHz |
|---|---|
| | 100 : 44.1kHz  101 : 88.2kHz  110 : 176.4kHz |
| quantization bit rate information | 01 : 16bit    10 : 20bit    11 : 24bit | reproduction quality information for digital image data

| sampling frequency information | 001 : 48kHz   010 : 96kHz |
|---|---|
| quantization bit rate information | 01 : 16bit    10 : 20bit    11 : 24bit |

Fig.18B

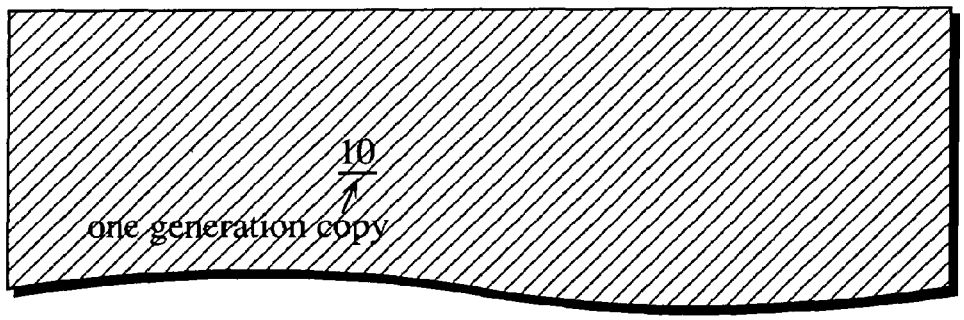

Copyrighted Digital Product one generation copy

Fig.18C

Duplicate

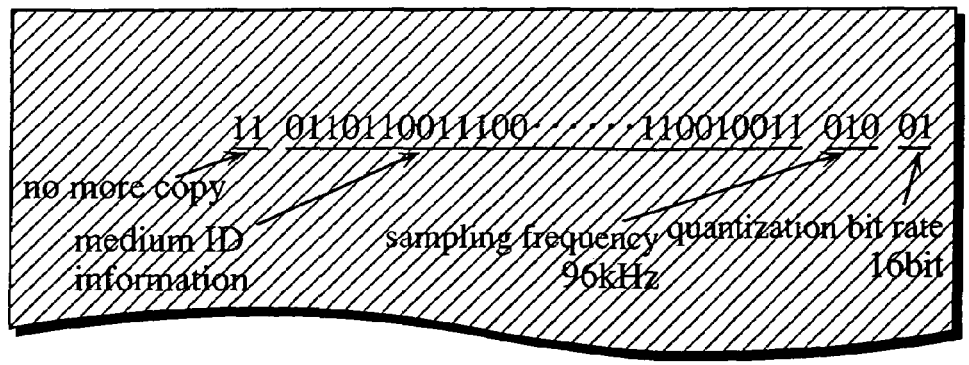

11 01101100111100······110010011 010 01 no more copy
medium ID
information
sampling frequency  quantization bit rate
96kHz              16bit

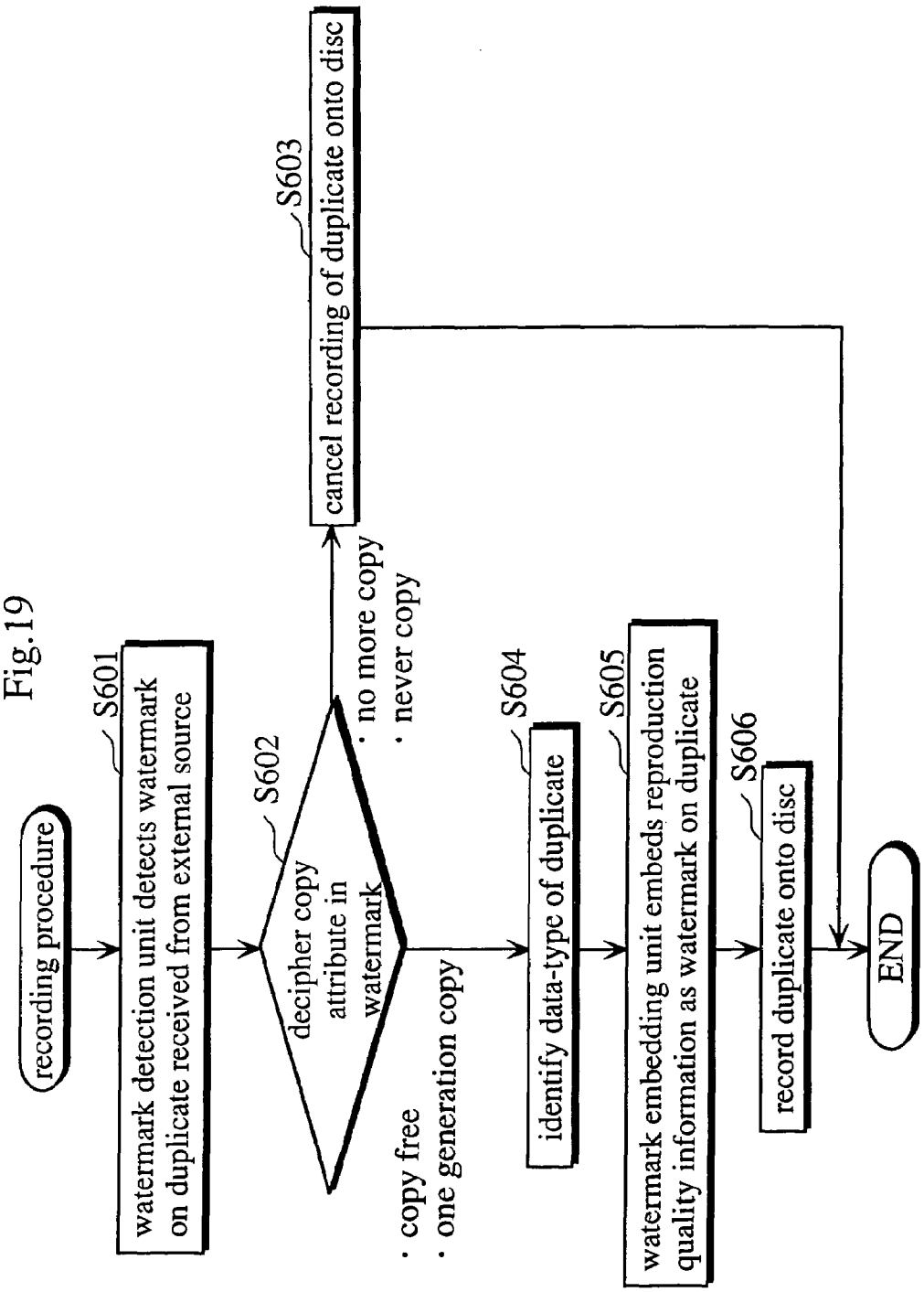

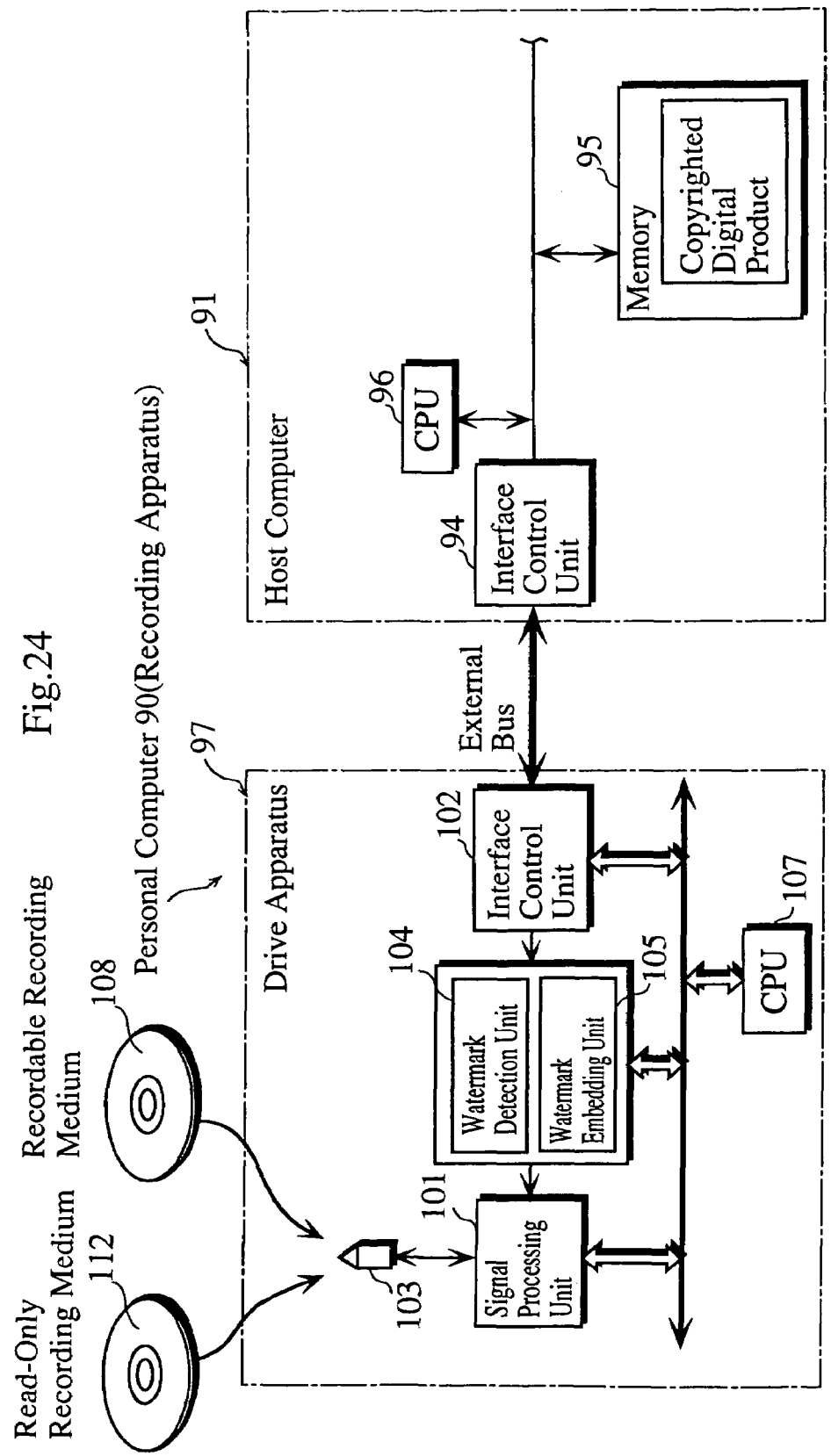

RECORDER FOR RECORDING COPY OF PRODUCTION ON THE BASIS OF COPY ATTRIBUTE EMBEDDED AS ELECTRONIC WATERMARK IN THE PRODUCTION, REPRODUCING DEVICE FOR REPRODUCING RECORDED COPY, RECORDED MEDIUM, RECORDING METHOD, AND REPRODUCING METHOD

TECHNICAL FIELD

The present invention relates generally to copyright technology that seeks to protect a copyrighted digital product by embedding a copy attribute as a watermark on the product, and more particularly to a recording apparatus, medium, and method for recording personal-use duplicates in accordance with the embedded copy attribute, and a reproduction apparatus and method for reproducing the personal-use duplicates.

BACKGROUND ART

Given the huge increase in the availability of copyrighted digital products in recent years, much importance has been placed on developing technology that adequately protects the right of the copyright holder to fully control the recording of duplicates of the digital product (hereafter, simply "product"). Particular interest has been focused on improving methods of embedding as a watermark on both the product and duplicates of the product, information that protects the copyright.

A watermark is information that has been multiplexed onto selected areas of main product data, or "content," of the product (note: data headers, control information, etc, do not qualify as content). The multiplexing process involves an ID code being assigned to the content. Take, for example, an ID code of "10010110 . . . " and content being image data. In this case, the value of each pixel of image data is matched with a corresponding bit of the ID code in order from the top left corner. If the value of the pixel and the bit of ID code are matched then the value of the pixel is used unaltered, and if not matched then the pixel is assigned a new value being the same as the bit of ID code.

Image data having information multiplexed as a watermark is generated by repeating this process for all the bits of the ID code. Given the difficulty in identifying the actual areas in the content that have been multiplexed, it is common to refer to the multiplexed information as having been "embedded" on the product.

In the above example, the value of each pixel of image data is matched with a corresponding bit of the ID code in order from the top left corner. The ID code can, however, be broken up and arranged randomly, making it even more difficult to locate where in the content the information has been embedded. Copyright protection information embedded as a watermark on the product in this manner is thus well concealed, and the possibility of the embedded information being tampered with or altered is extremely remote.

Further information relating to watermark technology including the advantages and various embedding methods is available from the following references:

MATSUI Kineo, *The Basics of Watermarks*, Morikita Pub, 1998.

INOUE Akira, *Watermarks—Encryption Systems for the Multimedia Age*, Maruyama Gakugei Pub, 1997.

"Watermarks Protecting the Multimedia Age," in *Nikkei Electronics*, 24 Feb. 1997.

Currently, the most common type of information embedded as a watermark is a copy attribute, otherwise referred to as "copy generation information." There are four basic levels of copy attribute: "copy free" permitting unlimited recording of duplicates, "one generation copy" limiting the recording of duplicates to one generation, "no more copy" prohibiting a further recording of duplicates, and "never copy" prohibiting all recording of duplicates. A typical operation of a recording control employing a copy attribute will now be described with reference to FIG. 1.

In FIG. 1 the recording apparatus is a personal computer 81 that records a product downloaded from a public network 82. The product has a copy attribute embedded as a watermark thereon and the personal computer 81 records a duplicate of the product onto a recording medium in accordance with the embedded copy attribute. The recording medium in FIG. 1 is a recordable optical disc, being a DVD-RAM, DVD-R, or DVD-RW, etc.

If the embedded copy attribute shows "no more copy" (arrow y1) or "never copy" (arrow y2) then the recording of the duplicate onto the disc is cancelled, and if "copy free" (arrow y3) is shown then duplicates of the product are freely recorded.

A duplicate can also be recorded onto the disc if the embedded copy attribute shows "one generation copy" (arrow y4), but not before the copy attribute has been changed into a copy attribute showing "no more copy" and the new copy attribute has been embedded as a watermark on the duplicate. Thus the recording of duplicates can be limited to personal-use duplicates, and the spirit of Article 30 of the Japanese Copyright Act, which allows a limited number of duplicates to be recorded without the specific permission of the copyright holder, is not violated. A typical operation of a reproduction control employing a copy attribute will now be described with reference to FIG. 2.

In FIG. 2 the reproduction apparatus is a DVD player 83 and the image recorded on the disc is reproduced on a display 84. If the recording medium is a read-only disc, being a CD-ROM, DVD-RAM, etc, having a product recorded thereon, then the DVD-player 83 conducts the reproduction unconditionally. However, if the recording medium is a recordable disc having a duplicate of a product recorded thereon, then the DVD-player 83 refers to the copy attribute embedded as a watermark on the duplicate in order to judge whether the duplicate should be reproduced.

If the copy attribute embedded on the duplicate shows "never copy" (arrow y5) then reproduction of the duplicate is canceled since it is reasonable to assume that the duplicate has been improperly recorded. A legitimate recording apparatus would not have recorded a duplicate of a product embedded with a copy attribute showing "never copy."

A copyright infringement is also assumed if the embedded copy attribute shows "one generation copy" (arrow y6) since this copy attribute should have been changed to a copy attribute showing "no more copy" and the new copy attribute should then have been embedded as a watermark on the duplicate.

On the other hand, the reproduction apparatus permits the reproduction of the duplicate when the embedded copy attribute shows either "copy free" (arrow y7) or "no more copy" (arrow y8).

In practice, however, the use of existing copyright protection technology to embed a copy attribute showing "one generation copy" as a watermark on the product has proved inadequate in preventing copyright infringements since illegitimate copy machines can be used to record improper duplicates. When a duplicate is recorded onto a disc by a legitimate recording apparatus it is normal for the duplicate to occupy multiple sectors of the disc. However, when improper duplicates are recorded using an illegitimate copy machine, data is read in sectors from each of the occupied sectors of a disc designated as the source disc and then the read data is written, again in sectors, onto a target disc, this procedure being repeated for all of the sectors of the source disc. Duplicates recorded in this manner are known as "dead copies."

FIG. 3 shows a process by which dead copies are recorded using an illegitimate copy machine. In FIG. 3 the personal computer 81 stores a product downloaded from the public network 82. If the copy attribute embedded on the product shows "one generation copy," a duplicate of the product is generated, the copy attribute is changed into a copy attribute showing "no more copy," and the new copy attribute is embedded as a watermark on the generated duplicate. The duplicate is then recorded onto a recordable disc 86 (arrow y4).

A copyright infringement occurs when the disc 86, having recorded thereon the duplicate embedded with the copy attribute showing "no more copy," is designated as the source disc (arrow y9) and a duplicate of the duplicate, referred to as a second-generation duplicate, is recorded in sector units onto a target disc (arrow y10) by an illegitimate copy machine. This improper recording process results in a disc 87 having the second-generation duplicate recorded thereon. Discs 88 (arrow y11) and 89 (arrow y12) are generated through a repetition of this process.

The reproduction apparatus will reproduce the improperly recorded discs 87, 88 and 89 normally when instructed to do so, since they all are embedded with the copy attribute showing "no more copy." Thus unlimited second-generation duplicates can be recorded of the product embedded with a copy attribute showing "one generation copy," and the copyright of the product is effectively rendered worthless.

The recording of dead copies does not even require a specialized copy machine since an ordinary personal computer can be equipped to carry out the improper recording process simply by installing an exclusive copy seal. When dead copies are recorded using a personal computer, data is firstly read from each of the occupied sectors on the source disc and then stored on the internal memory or the hard disk of the computer. The stored data is then written onto corresponding sectors of the target disc, this procedure being repeated for all sectors of the source disc. Improved methods of embedding copyright protection information are thus needed in order to prevent copyright infringements resulting from the simple generation of dead copies.

DISCLOSURE OF INVENTION

The present invention provides a recording apparatus, a reproduction apparatus, and a recording medium, with a view to preventing the reproduction of dead copies recorded by an illegitimate copy machine.

The above objective is to be achieved by a recording apparatus including (a) an acquiring unit for acquiring the copy attribute embedded on the product, (b) a changing unit for changing the acquired copy attribute into a copy attribute showing no more copy when the acquired copy attribute shows one generation copy, (c) a reading unit for reading from the recording medium at least a part of medium ID information recorded on the recording medium in an unalterable state, and (d) a recording unit for recording onto the recording medium the duplicate having both the copy attribute showing no more copy and the read medium ID information embedded as a watermark thereon.

The legitimacy of the duplicate recorded on the recording medium can thus be checked when the reproduction apparatus receives an instruction to reproduce the duplicate by comparing the medium ID information recorded on the recording medium and the medium ID information embedded as a watermark on the duplicate.

This system allows a legitimate duplicate to be clearly distinguished from an illegitimate duplicate, and the reproduction of the illegitimate duplicate can thus be prevented. Risk of the embedded medium ID information having been tampered with or altered is extremely low given the difficultly in locating the area in the content of the duplicate where the medium ID information has been embedded as a watermark. Reproduction of the duplicate is only permitted when 1 bit out of $2^N$ bits has been embedded as a watermark thereon, N being the number of bits of medium ID information that have been embedded.

When N bits of medium ID information are to be embedded as a watermark on the duplicate, it is desirable to have the reading unit read at least a lot number, being a number identifying the lot of the recording medium at the time of manufacture, from a burst cutting area (BCA) of the disc, and to have at least the read lot number embedded as a watermark when the duplicate is recorded onto the recording medium by the recording unit. This allows the reproduction of the duplicate to be regulated by comparing the embedded lot number with the lot number recorded on the BCA of the recording medium.

Furthermore, the recording apparatus has a storing unit for storing one area code, being the area code of (a) the recording apparatus, (b) a package media that recorded the product, and (c) a provider that supplied the product. It is desirable to have the stored area code embedded as an additional watermark on the duplicate when the duplicate is recorded by the recording unit. The area code embedded on the duplicate and the area code of the reproduction apparatus can then be compared when the duplicate is to be reproduced, thus revealing whether or not the duplicate is being reproduced for personal-use. Embedding the stored area code as an additional watermark on the duplicate thus allows any doubts relating to the legitimacy of the duplicate to be dispelled.

The recording apparatus also has a generating unit for generating reproduction quality information that shows restrictions relating to a reproduction quality of the duplicate. It is desirable to have the generated reproduction quality information embedded as an additional watermark on the duplicate when the duplicate is recorded by the recording unit. In this way the product can be distinguished from the duplicate by having the reproduction apparatus reproduce the duplicate based on the embedded reproduction quality information.

BRIEF DESCRIPTION OF DRAWINGS

FIG. 7A shows an example of a copy attribute;

FIG. 7B shows an internal structure of a recordable optical disc 108;

FIG. 7C shows a copy attribute prior to being changed by a watermark embedding unit 105 of the first embodiment;

FIG. 7D shows the copy attribute after being changed by the watermark embedding unit 105 of the first embodiment;

FIG. 11A shows an example of an area code;

FIG. 11B shows a copy attribute prior to being changed by a watermark embedding unit 105 of the second embodiment;

FIG. 11C shows the copy attribute after being changed by the watermark embedding unit 105 of the second embodiment;

FIG. 17 shows an example of quantization using a quantization bit rate of 8 and 9 bits;

FIG. 18A shows an example of reproduction quality information relating to digital sound and image data;

FIG. 18B shows a copy attribute prior to being changed by a watermark embedding unit 105 of the third embodiment;

FIG. 18C shows the copy attribute after being changed by the watermark embedding unit 105 of the third embodiment;

FIG. 19 is a flowchart showing a processing procedure of a recording control of a CPU 107 of the third embodiment;

FIG. 24 shows an internal structure of the personal computer 90 used in a variation (c) of the first embodiment;

DETAILED DESCRIPTION OF THE INVENTION

Three preferred embodiments of the present invention will now be described with reference to the drawings.

FIRST EMBODIMENT

Figure 1:
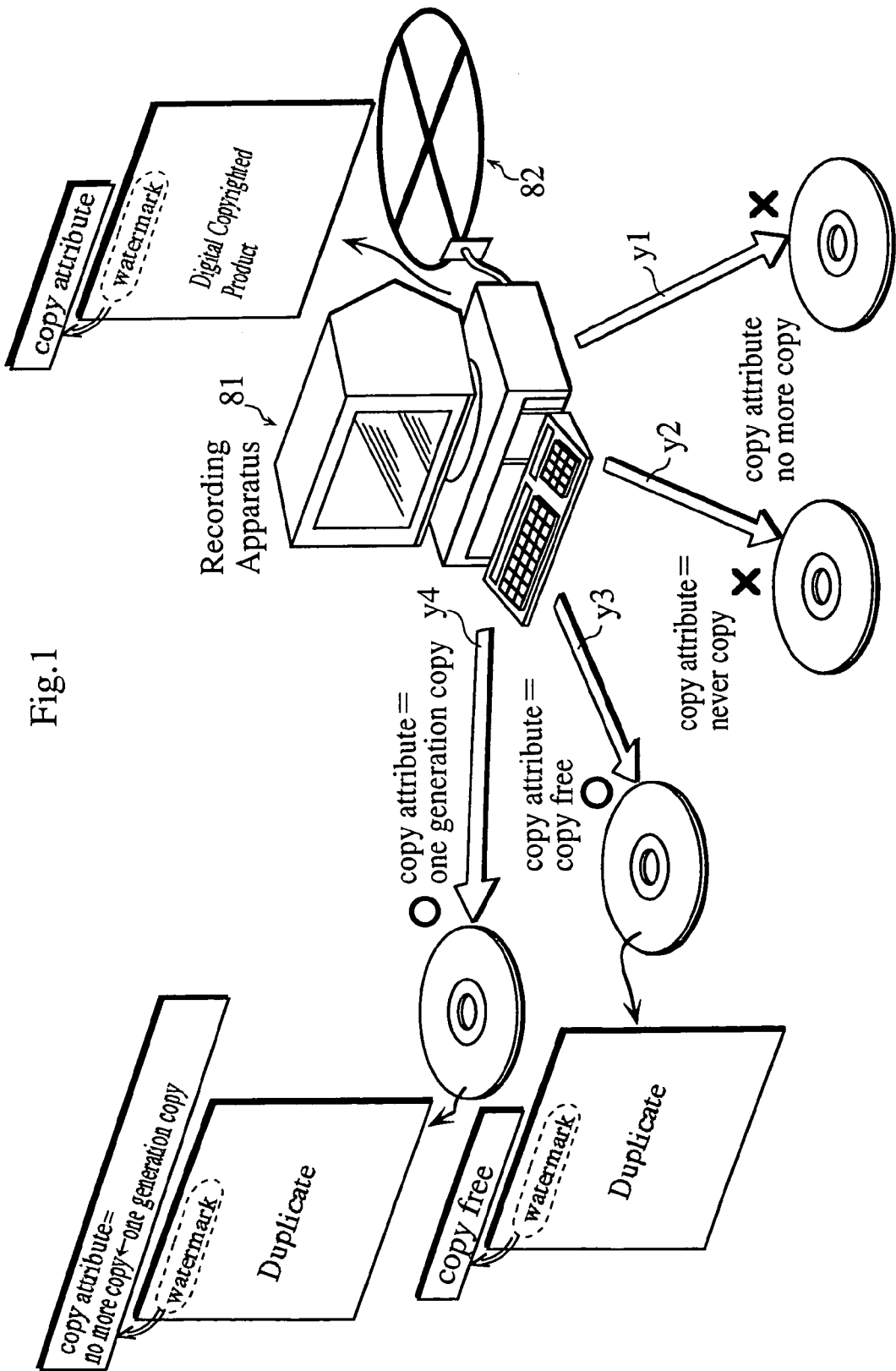
FIG. 1 shows a typical operation of a recording control employing a copy attribute.
Figure 2:
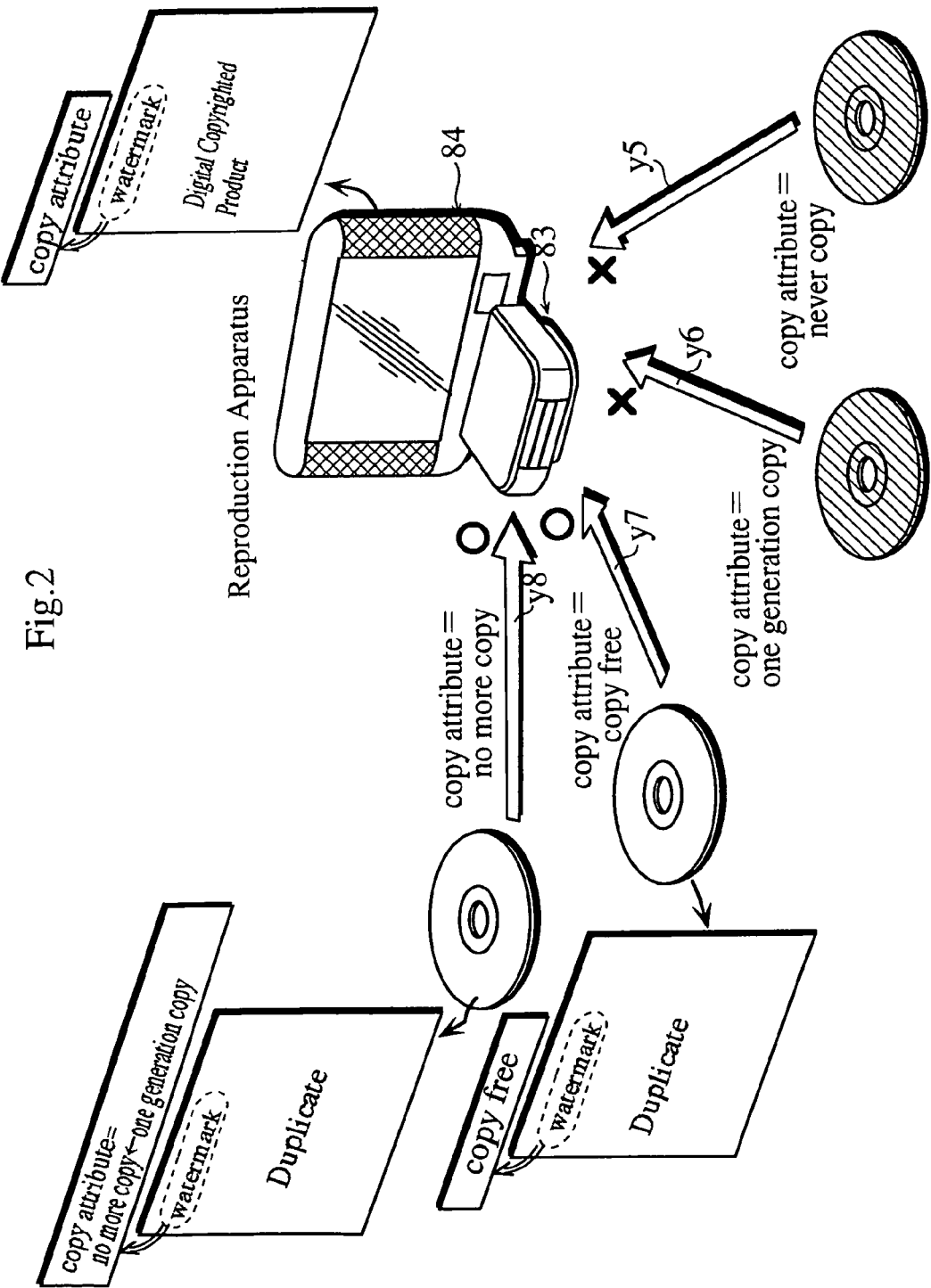
FIG. 2 shows an operation of a reproduction control employing a copy attribute.
Figure 3:
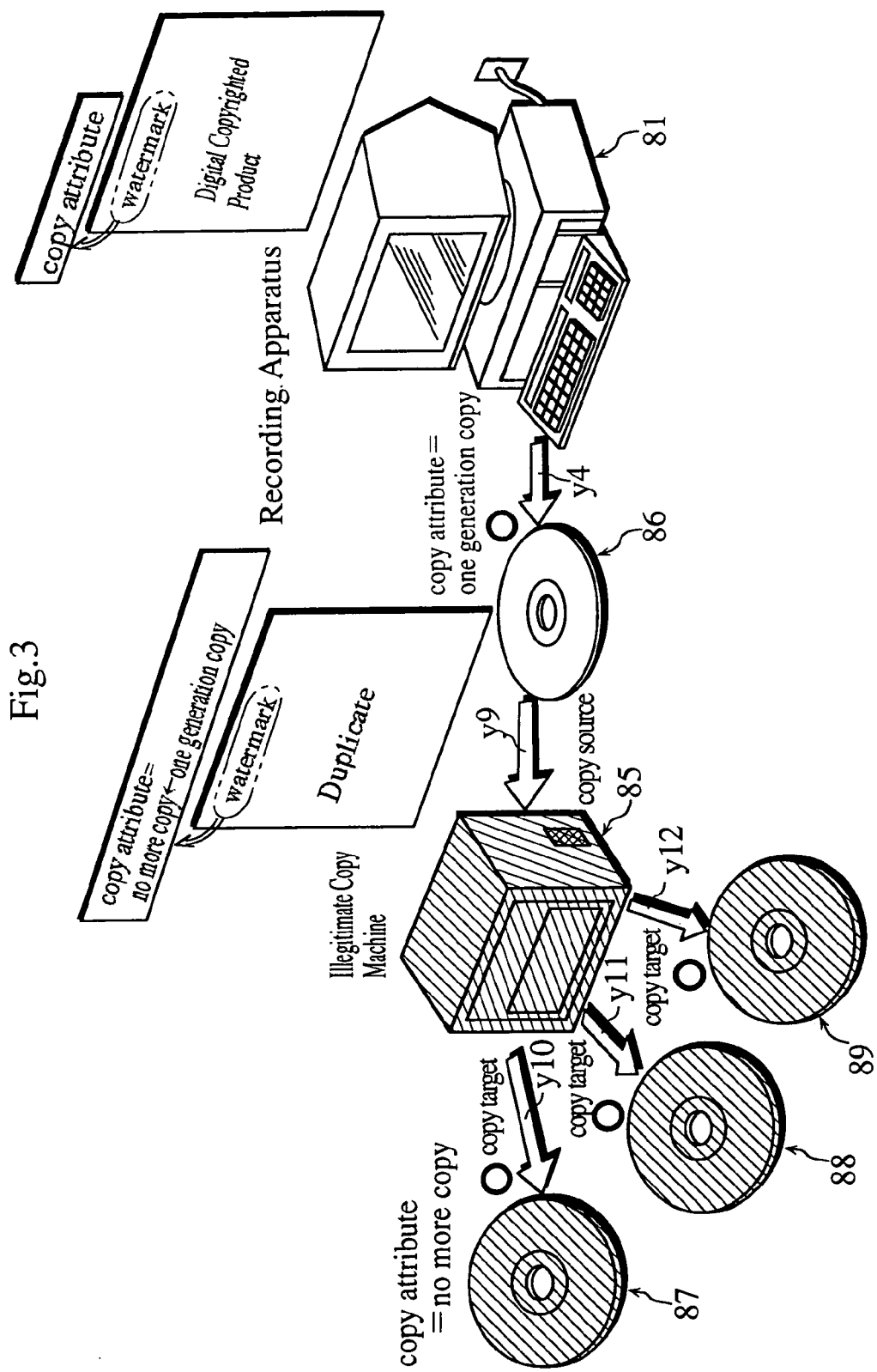
FIG. 3 shows duplicates of a copyrighted digital product being recorded by an illegitimate copy machine.
Figure 4:
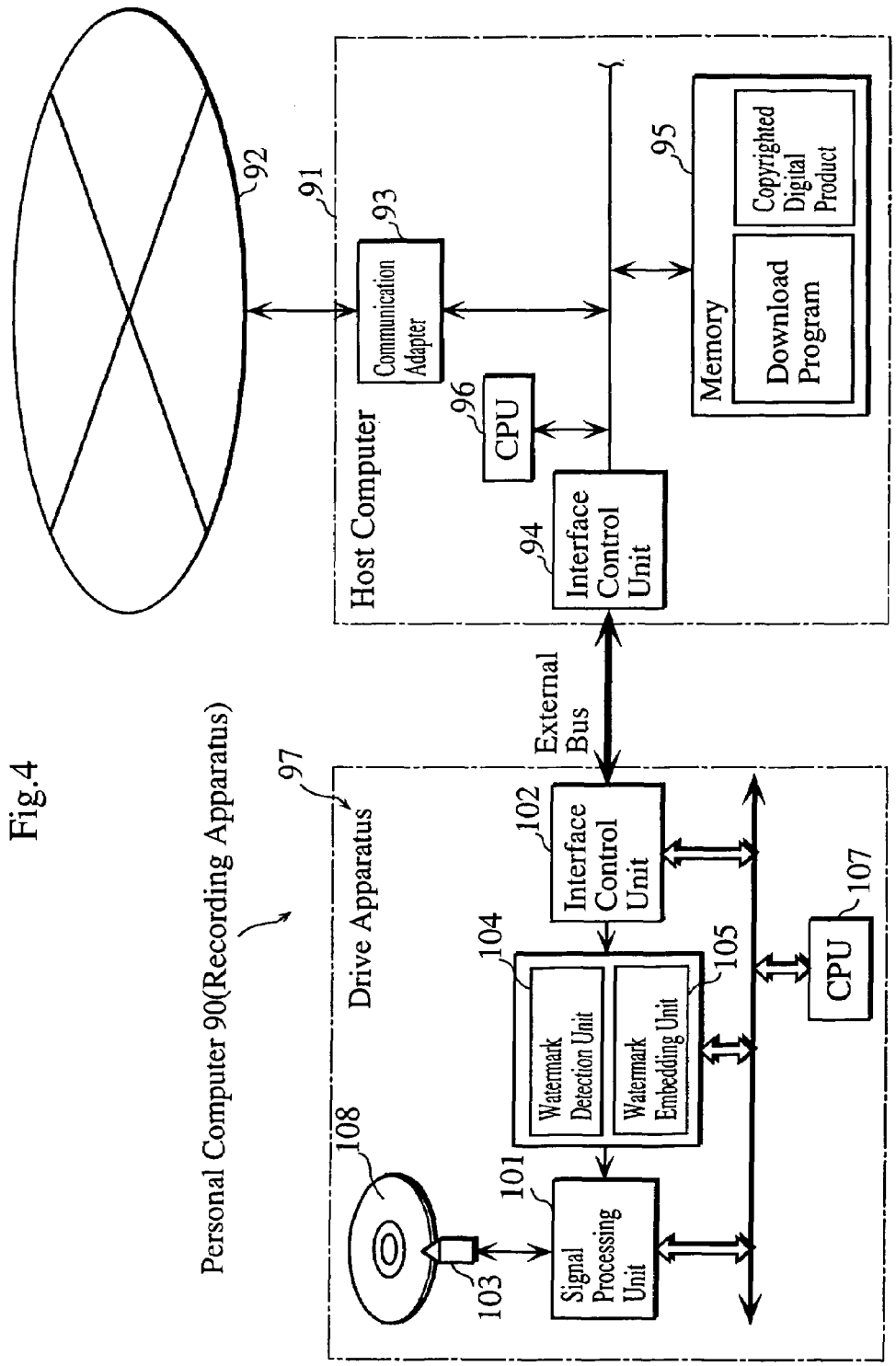
FIG. 4 shows an internal structure of a personal computer 90.

FIG. 4 shows an internal structure of a personal computer 90 that includes a host computer 91 and a drive apparatus 97 and which stores a copyrighted original digital product (i.e. "product") downloaded from a public network 92. The product in FIG. 4 has a copy attribute embedded as a watermark thereon, and a recording apparatus, being the personal computer 90, records the product in accordance with the embedded copy attribute.

The host computer 91 includes a communication adapter 93 for communicating with the network 92, an interface control unit 94 for conducting data transmission with the drive apparatus 97, memory 95, and a CPU 96. The memory 95 has (a) a downloading program for acquiring a product comprising images, music, and the like from the network 92, and recording a duplicate of an acquired product onto a recordable optical disc 108, and (b) the product stored therein. The product stored in the memory 95 of the host computer 91 has a copy attribute embedded as a watermark thereon. In order to record a duplicate of the product onto the disc 108, the host computer 91 first generates the duplicate from the stored product and then outputs, via an external bus, a recording command together with the generated duplicate to the drive apparatus 97.

The drive apparatus 97 functions to load the disc 108 and write the duplicate onto the disc 108 in accordance with the recording command outputted by the host computer 91. As shown in FIG. 4, the drive apparatus 97 includes a signal processing unit 101, an interface control unit 102, an optical head 103, a watermark detection unit 104, a watermark embedding unit 105, and a CPU 107. The product from which a duplicate will be generated for recording onto the disc 108 consists of (a) moving picture image data compressed in accordance with MPEG (Moving Picture Experts Group) specifications, and (b) sound data encoded using encoding methods such as LPCM, Dolby-AC3, MPEG-audio, MPEG-AAC, MP3, and the like. The duplicate thus recorded on the disc 108 can then be reproduced by the reproduction apparatus.

The signal processing unit 101 modulates data to be written onto the disc 108 and assigns an error correction code to the data. The interface control unit 102 controls input and output to the external bus and the signal processing unit 101. The duplicate outputted by the host computer 91 connected to the external bus is received, via the external bus, by the interface control unit 102, which then outputs the duplicate to the watermark detection unit 104.

The optical head 103 is driven by a seek mechanism (not shown in drawings) and uses a laser beam to write data onto the disc 108. The watermark detection unit 104 detects the copy attribute embedded as a watermark on the duplicate outputted by the interface control unit 102 and then judges the copy attribute (note: at this stage in the process the copy attribute embedded on the generated duplicate is identical to that embedded on the product stored in the memory 95).

FIG. 7A shows an example of a copy attribute. A copy attribute has a 2 bit value that allows the watermark detection unit 104 to judge whether to permit a recording of the generated duplicate, "00" being copy free, "10" being one generation copy, "11" being no more copy, and "01" being never copy. When the embedded copy attribute shows "10" (one generation copy), for instance, the watermark embedding unit 105 acquires medium ID information recorded on a predetermined area (i.e. a burst cutting area) of the disc 108, and then via the interface control unit 102, embeds the acquired medium ID information as a watermark on the duplicate. What follows is a description of a construction of the disc 108. A description of the burst cutting area (BCA) of the disc 108 will also be included.

FIG. 7B shows a physical construction of the disc 108. As shown in FIG. 7B, an area on the disc is divided into a user area and the BCA. The BCA is formed by removing a reflective film in strips from a surface of the disc, and information can only be read from the BCA by an apparatus with special authority. 188 bytes of data (lot number, and the like) are recorded on the BCA in an unalterable state, and the medium ID information acquired by the watermark embedding unit 105 is composed of the data recorded on the BCA.

After acquiring the medium ID information from the BCA, the watermark embedding unit 105 receives, via the external bus, the duplicate of the product sent from the host computer 91, and embeds the medium ID information as a watermark on the duplicate. FIGS. 7C and 7D show a comparison of the copy attribute prior to and after, respectively, being changed by the watermark embedding unit 105. As shown in FIG. 7C, the watermark embedding unit 105 only changes the copy attribute when the copy attribute embedded on the duplicate shows "10" (one generation copy). The copy attribute showing "10" is changed into a copy attribute showing "11" (no more copy) and the new copy attribute is added to the acquired medium ID information, which has a value of 011011011100 . . . 110010011 in the given example.

The CPU 107 controls positioning and revolution speed, and the like, of the optical head 103 in accordance with a command that is dispatched from the host computer 91 and received via the external bus and the interface control unit 102. The CPU 107 then controls writing of the duplicate onto the disc 108 after receiving the duplicate from the host computer 91 via the external bus and the interface control unit 102. If the watermark detection unit 104 detects a copy attribute showing "copy free," then the duplicate is written onto the disc 108 as is, and if the detected copy attribute shows "no more copy" or "never copy" then writing of the duplicate onto the disc 108 is canceled.

Figure 5:
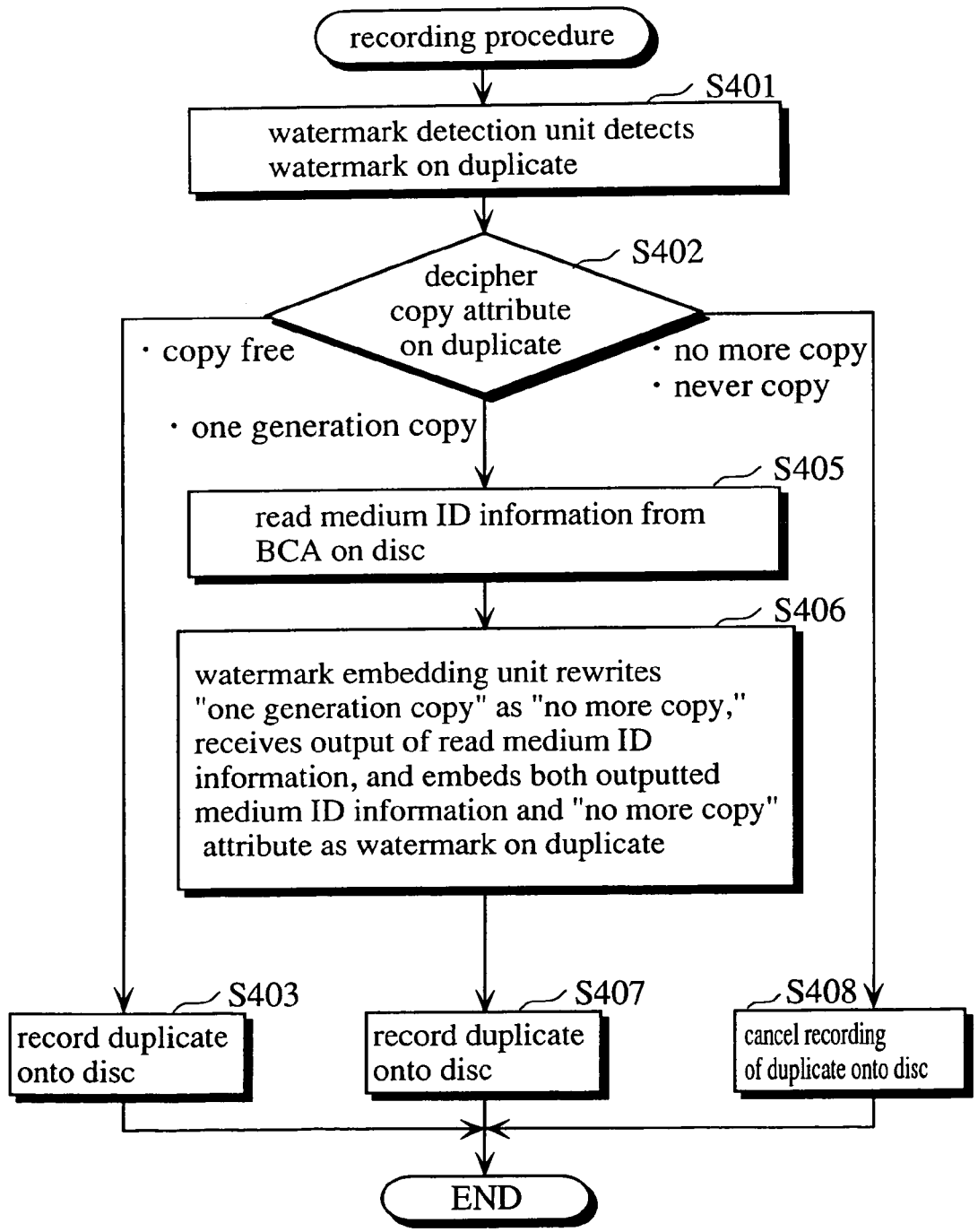
FIG. 5 is a flowchart showing the processing procedure of a recording control of a CPU 107 of the first embodiment.

If a copy attribute showing "one generation copy" is detected, writing of the duplicate onto the disc 108 is permitted, but only after the copy attribute has been changed into a copy attribute showing "no more copy." The watermark embedding unit 105 then proceeds to embed both the new copy attribute and acquired medium ID information as a watermark on the duplicate. Recording control is performed by the CPU 107 in accordance with a processing procedure shown in the flowchart of FIG. 5. A control procedure of the CPU 107 when medium ID information is acquired from the BCA of the disc and embedded as a watermark on the duplicate will now be described with reference to FIG. 5.

When a product is acquired from a source external to the personal computer 90 such as a public network, a duplicate of the product is generated in the memory 95 (step S401), which is also where the acquired product is stored. The duplicate is then outputted to the drive apparatus 97 where the watermark detection unit 104 detects the copy attribute embedded as a watermark on the generated duplicate. As noted above, at this stage in the process the generated duplicate and the product stored in the memory 95 are identical, which means that the copy attribute detected from the duplicate will be the same as that embedded on the stored product.

According to the first embodiment, the copy attribute is detected from the generated duplicate because the watermark detection unit 104 and the memory 95 exist on separate apparatus (i.e. the drive apparatus 97 and the host computer 91, respectively). However, if the watermark detection unit 104 and the memory 95 exist on the same apparatus (i.e. the host computer 91), it is preferable to have the copy attribute detected from the product rather than the generated duplicate. The copy attribute can also be detected directly from the product when the product is recorded on a read-only disc loaded in the drive apparatus 97.

Next, the CPU 107 performs procedures in accordance with the detected copy attribute (step S402). When the detected copy attribute shows "copy free" the CPU 107 records the generated duplicate onto the disc 108 as is (step S403), and when the detected copy attribute shows "no more copy" or "never copy" the CPU 107 cancels recording of the duplicate (step S408).

When a copy attribute showing "one generation copy" is detected, the CPU 107 conducts a special reading process to acquire medium ID information from the BCA of the disc 108 (step S405). The CPU 107 is only permitted to read the medium ID information from the BCA after receiving a special command, not available to a user, which is dispatched to the drive apparatus 97 from the host computer 91 in the case of a copy attribute showing "one generation copy" being detected.

The CPU 107 instructs the watermark embedding unit 105 to change the detected copy attribute into a copy attribute showing "no more copy," and sends the read medium ID information to the watermark embedding unit 105. The read medium ID information is then embedded as a watermark on the duplicate (step S406) and the CPU 107 proceeds to record the duplicate onto the disc 108 (step S407). A typical operation of a recording control employing a copy attribute will now be described with reference to FIG. 6.

Figure 8:
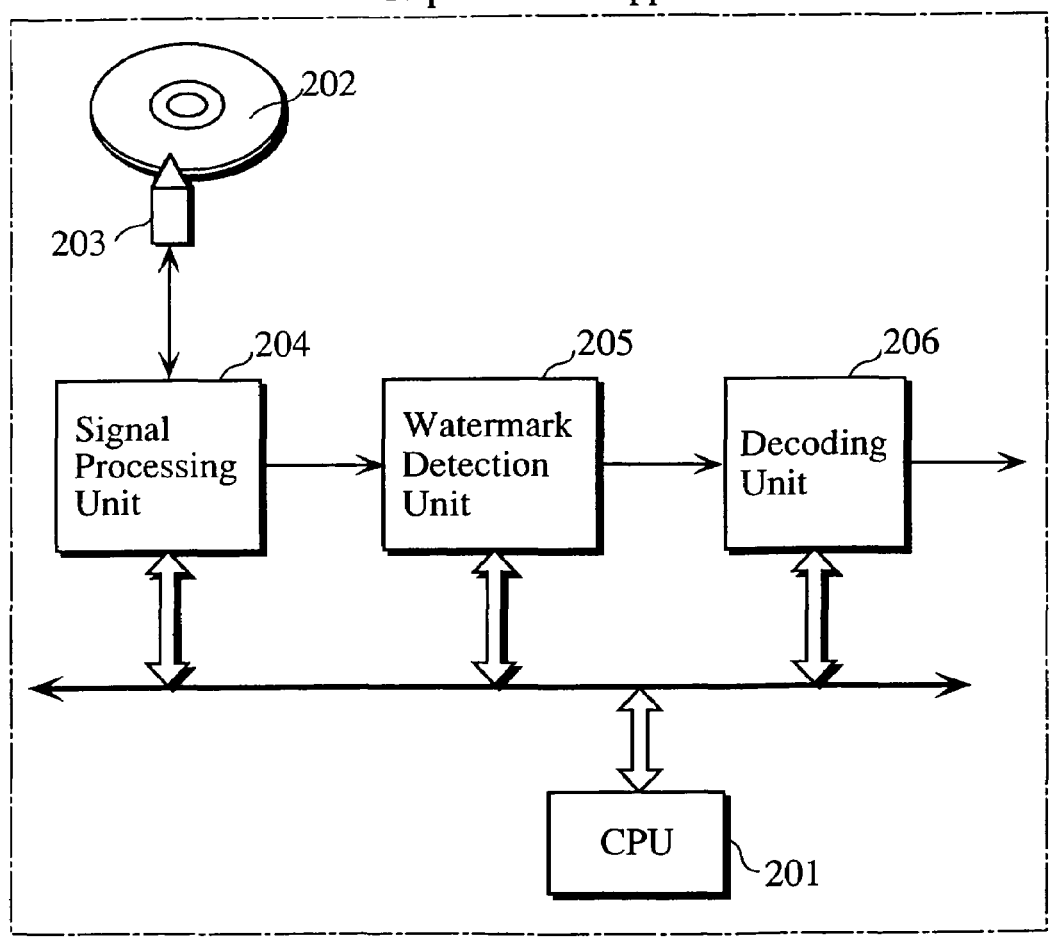
FIG. 8 shows an internal structure of a reproduction apparatus of the first embodiment.

Recording of a duplicate is prohibited when the copy attribute embedded on the product shows "no more copy" (arrow y21) or "never copy" (arrow y22), and permitted when the detected copy attribute shows "copy free" (arrow y23). Recording of a duplicate is also permitted when the embedded copy attribute shows "one generation copy" (arrow y24), but only after the detected copy attribute has been changed into a copy attribute showing "no more copy." The new copy attribute is then embedded as a watermark on the duplicate together with medium ID information read from the BCA of the disc 108. What follows is a description of the reproduction apparatus of the first embodiment. An internal structure of the reproduction apparatus is shown in FIG. 8.

The reproduction apparatus functions to reproduce a duplicate having both copy attribute and medium ID information embedded thereon. The reproduction apparatus includes an optical head 203, a signal processing unit 204, a watermark detection unit 205, a decoding unit 206, and a CPU 201. Optical disc 202 loaded in the reproduction apparatus can be either the recordable disc 108 or a read-only disc.

The signal processing unit 204 decodes a signal read from the disc 202 via the optical head 203 and corrects any errors that are detected. When this read data is a duplicate of the product the watermark detection unit 205 detects the medium ID information and the copy attribute, both of which are embedded as a watermark on the duplicate. The decoding unit 206 decodes the duplicate and this decoded duplicate is then outputted to an externally connected display apparatus and/or speakers as image and sound signals.

When a user instruction to reproduce the duplicate is received, the CPU 201 controls both positioning/revolution speed of the optical head 203, and reading of data from the disc 202. Once the signal processing unit 204 has decoded the read duplicate and corrected any errors, and the watermark detection unit 205 has detected the embedded information, the CPU 201 then reproduces the duplicate in accordance with the detected information.

What follows is a description of a control procedure of the reproduction apparatus when a duplicate having medium ID information embedded as a watermark is reproduced. Reference will be made to the flowchart in FIG. 9, which shows a processing procedure of the CPU 201.

The CPU 201 acquires disc-type information from the disc 202 loaded in the reproduction apparatus (step S701) and if the disc 202 is a read-only disc (i.e. a disc having the product recorded thereon) the CPU 201 conducts reproduction unconditionally (step S710). On the other hand, when the disc 202 is a recordable disc, the duplicate recorded on the disc 202 is regarded as being a possible second-generation duplicate. The CPU 201, therefore, instructs the watermark detection unit 205 to detect the copy attribute and medium ID information from the data read from the disc 202 (step S703) and then judges the detected copy attribute (step S704).

If the copy attribute shows "copy free," the CPU 201 reproduces the duplicate (step S710) since further checks for copyright infringement are considered unnecessary. However, if a copy attribute showing "one generation copy" is detected there is a high possibility of copyright infringement since "one generation copy" should have been changed into a copy attribute showing "no more copy" when the duplicate was recorded onto the disc 202. The CPU 201 thus prohibits reproduction of the duplicate (step S706). The CPU 201 also prohibits reproduction of the duplicate (step S706) when "never copy" is detected, since a legitimate recording apparatus would not have recorded a duplicate having "never copy" embedded as a watermark.

The duplicate is likely to be legitimate when the detected copy attribute shows "no more copy," although a possibility of copyright infringement is not completely removed since "no more copy" remains unaltered when an illegitimate copy machine is used to record a second-generation duplicate. In this case, legitimacy of the duplicate can be judged by comparing medium ID information embedded on the duplicate with medium ID information read from the disc 202. The embedded medium ID information and the read medium ID information only have to be partially matched for the duplicate to be considered a legitimate first-generation duplicate.

Figure 10:
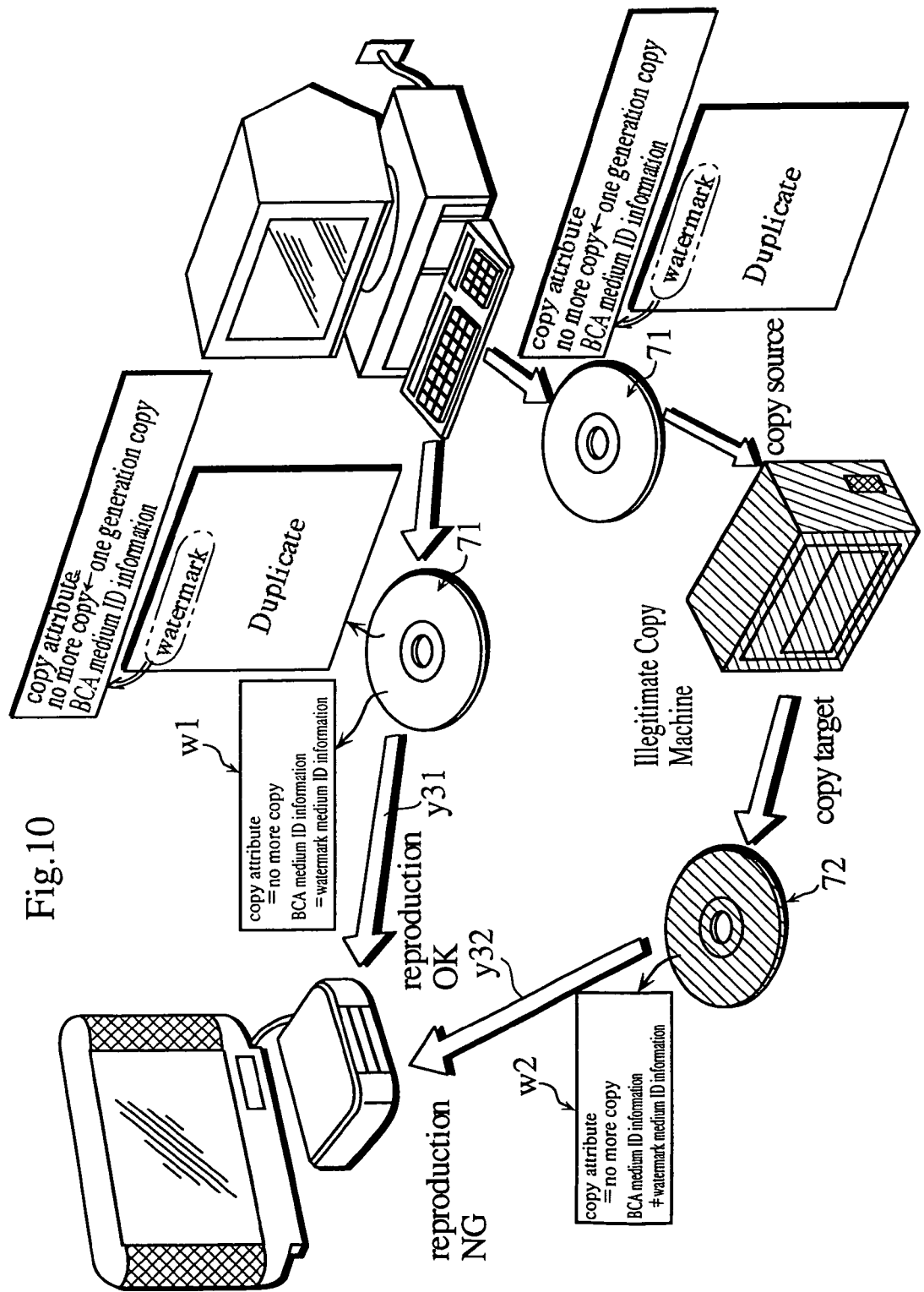
FIG. 10 shows an operation of the reproduction control by the reproduction apparatus of the first embodiment.

FIG. 10 shows a process of the first embodiment by which the reproduction apparatus prohibits reproduction of a duplicate. In FIG. 10 a legitimate duplicate has been recorded onto a recordable disc 71 using the recording apparatus of the first embodiment. However, the legitimate duplicate has then been further recorded onto a recordable disc 72 using an illegitimate copy machine, this further duplicate being a second-generation duplicate.

The legitimate duplicate recorded on the disc 71 is reproduced normally since "no more copy" is embedded as a watermark and the medium ID information embedded on the duplicate matches the medium ID information read from the BCA of disc 71 (frame w1). In comparison, reproduction of an illegitimate duplicate recorded onto the disc 72 is prohibited because the embedded medium ID information does not match the read medium ID information, despite "no more copy" being embedded on the duplicate (frame w2). What follows is a description of methods of embedding and detecting a watermark when the product is (a) still image data and (b) sound data.

Still image data is composed of a plurality of bit planes, each bit being composed of a plurality of blocks, and each block being composed of 8*8 pixels. To begin an embedding process, one or more blocks that satisfy a predetermined level of intricacy are selected from the plurality of blocks. A value of each pixel in a selected block is then rewritten with information (copy attribute, medium ID information, and the like) to be embedded as a watermark.

A rewriting process involves the value of each pixel in the selected block being compared, in order from the top left corner of the 8*8 pixel block, with a corresponding bit of information to be embedded as a watermark. If the value of the pixel and the corresponding bit are matched, then the value of the pixel is used unaltered, and if not matched, then the pixel is assigned a new value, being the same as the corresponding bit of information. This process is repeated for all the bits of information to be embedded as a watermark. The embedding process is completed by attaching to the still image data a map file showing the one or more blocks of the bit planes having information embedded as a watermark. The detection process for still image data having information embedded as a watermark will now be described.

First, the map file attached to the still image data is acquired so as to be able to identify the one or more blocks likely to have information embedded as a watermark. Detection of the copy attribute and the medium ID information embedded on the identified one or more blocks is then performed by reading, in order from the top left corner, each of the pixels comprising the block. What follows is a description of an embedding process for sound data.

Sound data is composed of a plurality of audio frames (applicable methods of encoding include LPCM, Dolby-AC3, MPEG-audio, MPEG-AAC, MP3, and the like), each audio frame being composed of a plurality of blocks, and each block being composed of 8*8 pixels. To begin the embedding process one or more blocks that satisfy a predetermined level of intricacy are selected from the plurality of blocks, and a value of each pixel in the one or more blocks is rewritten following the same procedure outlined above for the still image data. The embedding process is completed by attaching to the sound data a map file showing the one or more blocks of the audio frame having the information embedded as a watermark. A detection process for sound data having information embedded as a watermark will now be described.

First, the map file attached to the sound data is acquired so as to be able to identify the one or more blocks likely to have information embedded as a watermark. Detection of the copy attribute and medium ID information embedded on the identified one or more blocks is then carried out by reading, in order from the top left corner, each of the pixels comprising the block.

Effectiveness of the embedding process outlined above is enhanced because the information to be embedded as a watermark is written on intricate parts of the still image and sound data, thus remaining invisible and undetectable.

Although the process by which the map file shows the one or more blocks having information embedded as a watermark is indispensable to maintaining secrecy of the watermark, the map file is not a main focus of the present invention and will not be described in detail here. Incidentally, the map file is just one of the methods that can be employed to locate blocks containing information embedded as a watermark. Further details relating to generation of watermarks can be obtained from the following references:

Nimi, etc, "Image Depth Encoding Methods Employing Intricacy-Determined Area Division," Electronic Intelligence IRE Technical Report, IE97-14 (1997-5)

Yazaki, etc, "Mass Storage Steganography Methods Utilizing Natural Images as Dummy Data," Electronic Intelligence IRE Technical Report, IE97-43, PRMU97-74, MVE-59 (1997-07)

According to the first embodiment, reproduction of illegitimate duplicates (dead copies) can be prohibited by embedding, as a watermark on the duplicate, medium ID information that separately identifies each recording medium. When a user instruction to reproduce the duplicate is received, the embedded medium ID information is detected and reproduction control is either performed or cancelled depending on a result of a comparison between the embedded medium ID information and medium ID information recorded on the BCA of the disc.

While the medium ID information to be embedded as a watermark on the duplicate is completely different for each disc, it is desirable according to the first embodiment for the information to either identify a disc type (i.e. DVD-RAM, DVD-R, DVD-RW, and the like) or a lot number of the disc. Also, it is only necessary to embed as a watermark on the duplicate some, rather than all, of the medium ID information recorded on the BCA of the disc.

SECOND EMBODIMENT

A second embodiment seeks to prevent a legitimately recorded duplicate from being improperly used. A duplicate having "copy free" or "one generation copy" embedded as a watermark is designated for personal-use and is, therefore, only supposed to be used in an area in which it was recorded. Consequently, attempted reproduction of a duplicate outside a designated area of usage is considered a violation of this personal-use limitation. Such a violation can be prevented as follows.

An area code showing the designated area of usage of the duplicate can be embedded as a watermark on the duplicate. Then when a user instruction is received by the reproduction apparatus to reproduce the duplicate, the area code embedded on the duplicate can be compared with an area code recorded on the reproduction apparatus, and reproduction of the duplicate can be prohibited if the two area codes do not match.

The area code can identify, for instance, a country of origin of the recording apparatus or an area in which the recording apparatus was distributed. FIG. 11A shows an example usage of an area code in which a 3-bit value shows a designated area of usage of the recording apparatus, 000 being North America, 001 being Japan and Europe, 010 being South Asia, 011 being Latin America, and the like.

Alternative area codes that can be embedded as a watermark on the duplicate include an area code recorded on a package-type read-only disc on which a product is recorded, or an area code of a provider, being either a provider supplying the product via a public network 92 or a provider (broadcast station) broadcasting the product digitally via satellite.

Figure 12:
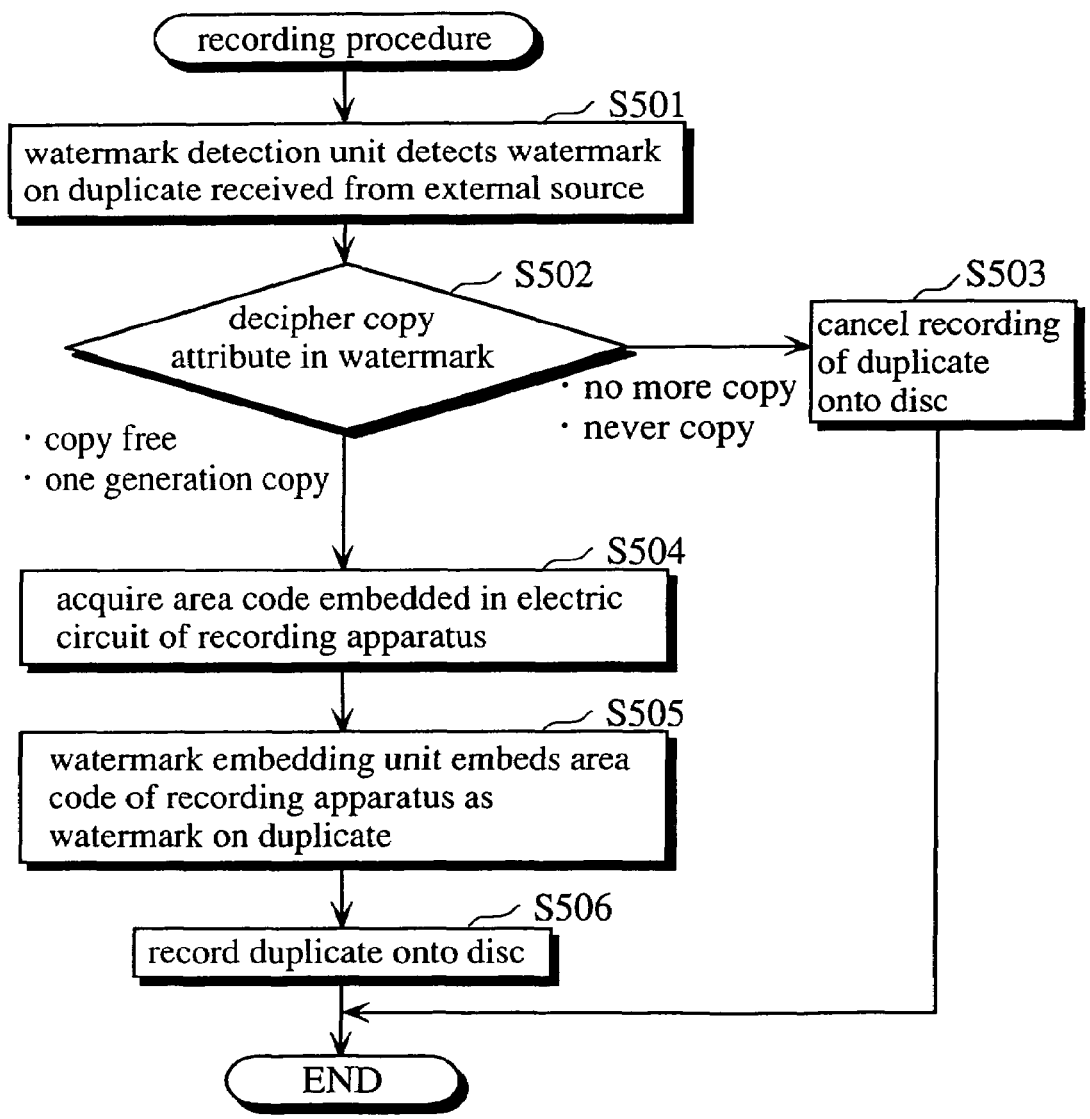
FIG. 12 is a flowchart showing a processing procedure of a recording control of a CPU 107 of the second embodiment.

FIG. 12 is a flowchart showing a process by which the CPU 107 (FIG. 4) of the recording apparatus of the second embodiment performs a recording control for additionally embedding an area code as a watermark on the duplicate. In FIG. 12, when a product is received from an external source, the CPU 107 generates a duplicate of the product and instructs the watermark detection unit 104 to detect the copy attribute embedded as a watermark on the generated duplicate (step S501). The CPU 107 then deciphers the detected copy attribute so as to determine an appropriate processing procedure (step S502).

When the detected copy attribute shows "no more copy" or "never copy" (step S503) recording of the duplicate onto a disc is cancelled. On the other hand, when a copy attribute showing "copy free" is detected, the CPU 107 acquires an area code provided on an electron circuit of the drive apparatus 97 (step S504). The watermark embedding unit 105 is then instructed to embed the acquired area code as a watermark on the generated duplicate (step S505) and the duplicate is recorded on the disc 108 (step S506).

A processing procedure when the detected copy attribute shows "one generation copy" is the same as for a copy attribute showing "copy free" (i.e. steps S504, S505, S506), except that the detected copy attribute is changed into a copy attribute showing "no more copy" and then a new copy attribute and medium ID information acquired from the BCA of the disc 108 are also embedded as a watermark on the generated duplicate as per the first embodiment.

FIGS. 11B and 11C show a comparison of the copy attribute prior to and after, respectively, being changed by the watermark embedding unit 105. As shown in FIG. 11B, when the detected copy attribute shows "10" (one generation copy) the watermark embedding unit 105 changes the copy attribute into a copy attribute showing "11" (no more copy). The "11" copy attribute is then attached to medium ID information having a value of 0110110011100 . . . 110010011001 as per the first embodiment (FIGS. 7C and 7D). The value "001" has been additionally attached to the medium ID information that was given in FIG. 7D, this being an area code showing that a duplicate was recorded in Japan.

Figure 13:
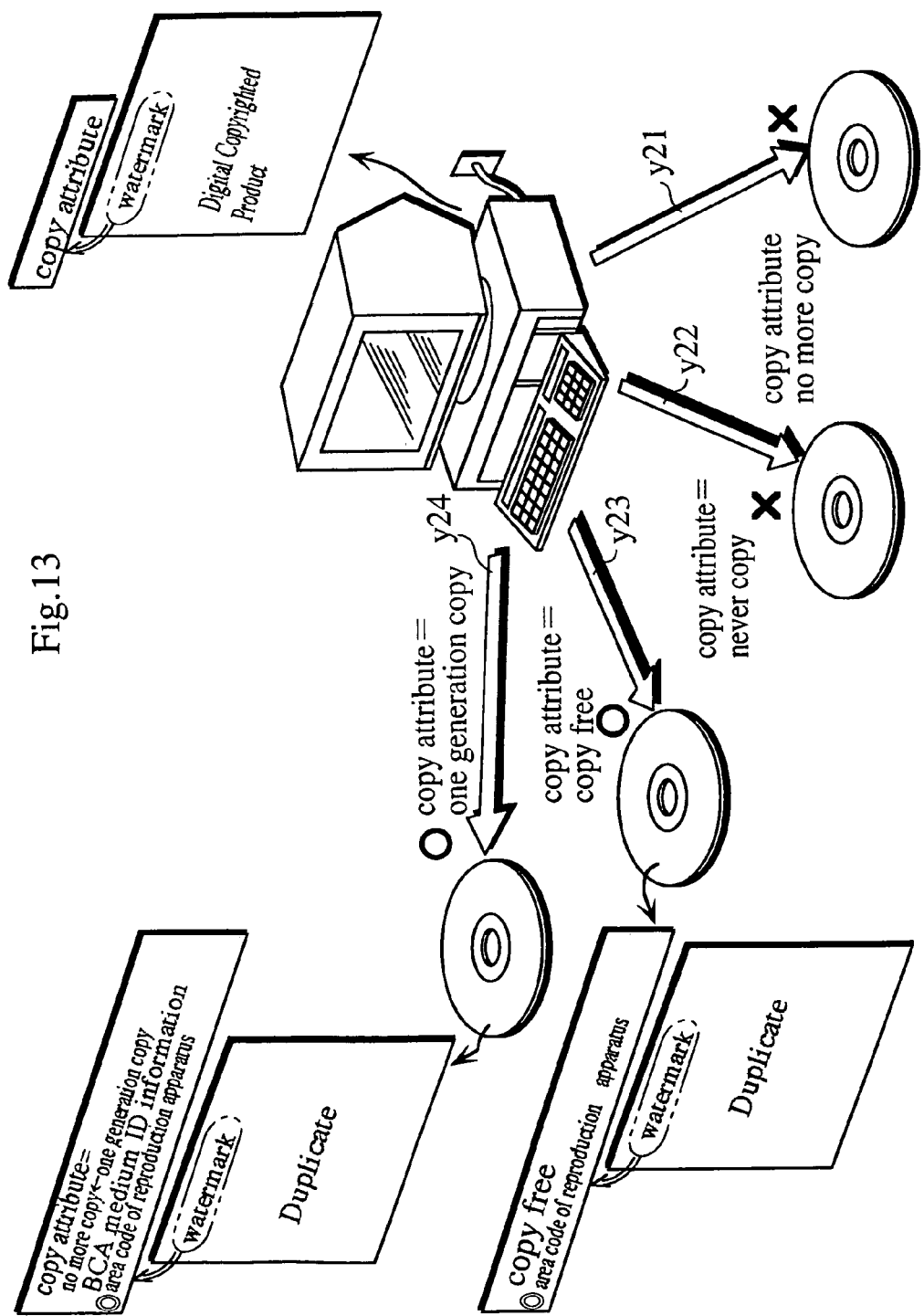
FIG. 13 shows an operation of the recording control employing a copy attribute of the second embodiment.

FIG. 13 shows a typical operation of a recording control employing a copy attribute according to the second embodiment. As FIG. 13 is based on FIG. 6, only differences will be described here.

Figure 6:
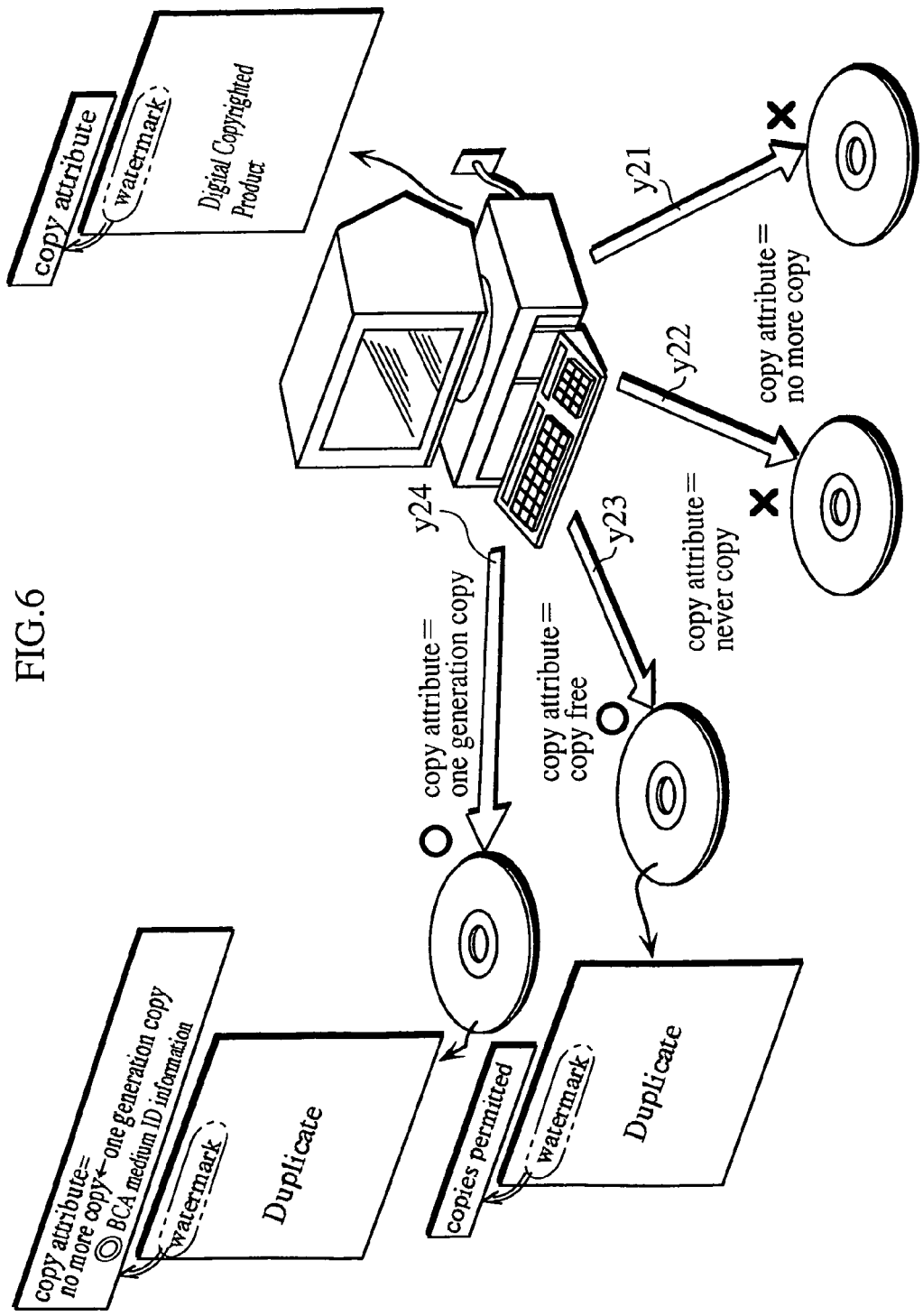
FIG. 6 shows a typical operation of the recording control employing a copy attribute of the first embodiment.

When a copy attribute showing "one generation copy" is embedded as a watermark on a product (arrow y24) the copy attribute is changed into a copy attribute showing "no more copy" and this new copy attribute is embedded, together with medium ID information, as a watermark on the duplicate as per the first embodiment (FIG. 6). According to the second embodiment (FIG. 13), however, an area code designating an area of usage of the recording apparatus is additionally embedded as a watermark on the duplicate. The area code is also additionally embedded on the duplicate when the detected copy attribute shows "copy free" (arrow y23).

Figure 14:
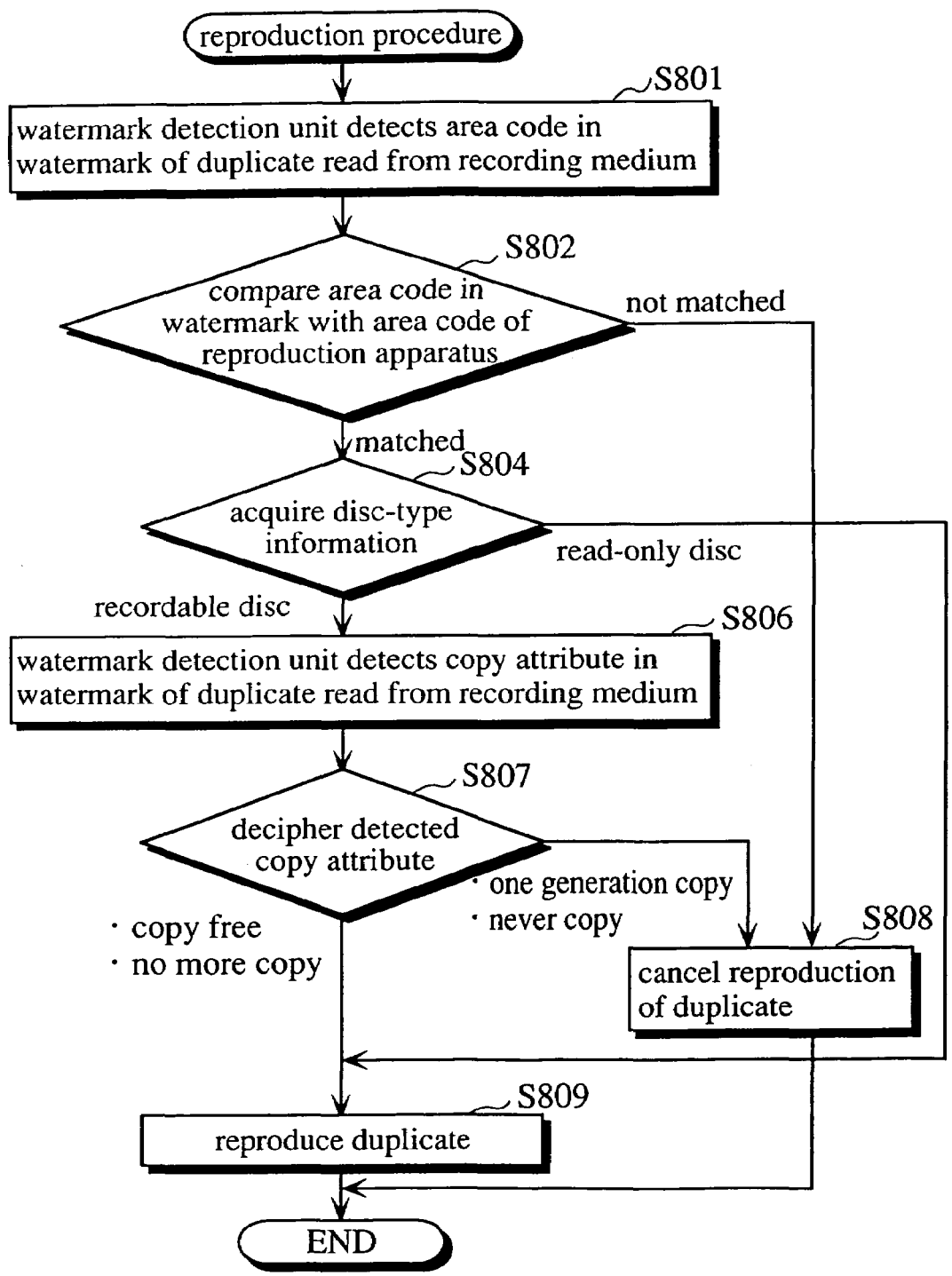
FIG. 14 is a flowchart showing a processing procedure of the reproduction control of the second embodiment.

FIG. 14 is a flowchart showing a process by which the CPU 201 (FIG. 8) of the reproduction apparatus of the second embodiment performs a reproduction control when an area code has been additionally embedded as a watermark on the duplicate. In FIG. 14 the CPU 201 first instructs the watermark detection unit 205 to detect the area code embedded on the duplicate read from the disc 202 (step S801). The CPU 201 then compares the detected area code with the area code acquired from the reproduction apparatus (step S802). Reproduction of the duplicate is cancelled if the two area codes are not matched (step S808), and if matched the CPU 201 proceeds to step S804.

It should be noted that the two area codes need only be partially matched for the CPU 201 to proceed to step S804. In other words, the area code embedded as a watermark on the duplicate and the area code provided on the reproduction apparatus need only be partially matched for the CPU 201 of the reproduction apparatus to judge that the duplicate is being reproduced legitimately for personal-use.

In step S804 the CPU 201 acquires disc-type information from the disc 202 and performs reproduction if the disc is a read-only disc (step S809). If the disc is a recordable disc, the CPU 107 instructs the watermark detection unit 205 to detect the copy attribute embedded on the duplicate (step S806) and then deciphers the detected copy attribute so as to determine an appropriate processing procedure (step S807).

If the detected copy attribute shows "copy free" or "no more copy," the embedded medium ID information is compared with the medium ID information recorded on the disc 202 as per the first embodiment, and if matched the CPU 201 reproduces the duplicate (step S809).

Figure 15:
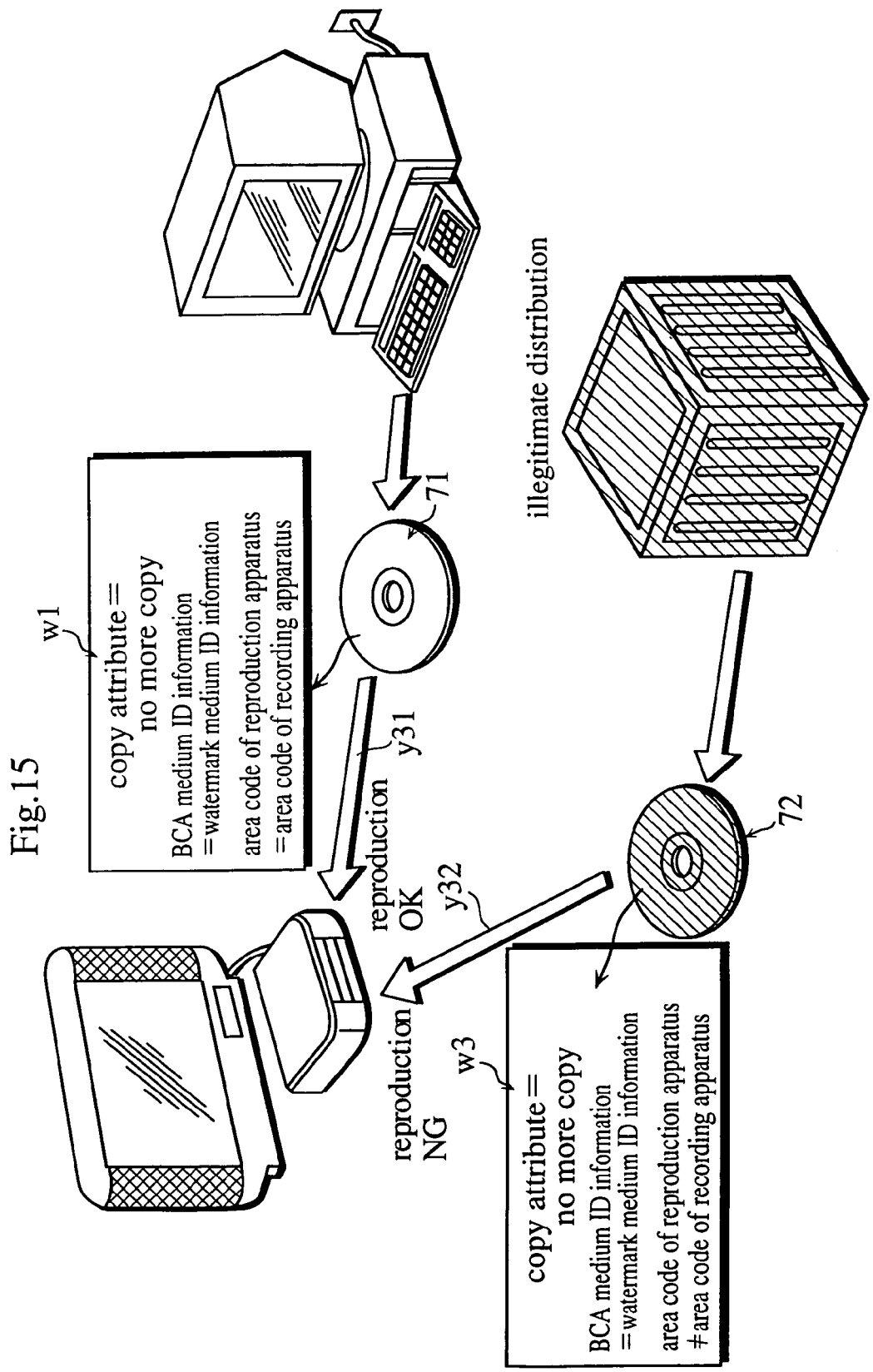
FIG. 15 shows a process by which the reproduction apparatus prohibits reproduction of a duplicate of the second embodiment.

FIG. 15 shows a process by which the reproduction apparatus prohibits reproduction of the duplicate according to the second embodiment. As FIG. 15 is based on FIG. 10, only differences will be described here.

In FIG. 15 duplicates recorded on discs 71 and 72 are both legitimate, although the disc 72 has been improperly distributed. The duplicate recorded on the disc 71 is viewed as legitimate and reproduction is processed, since the duplicate is embedded with a copy attribute showing "no more copy" and both the medium ID information and the area codes are matched (frame w1). On the other hand, reproduction of the duplicate recorded on the disc 72 is cancelled despite "no more copy" being embedded as a watermark and the medium ID information matching, since the embedded area code and the area code recorded on the reproduction apparatus do not match (frame w3).

Improper usage of a legitimately recorded duplicate can thus be prevented according to the second embodiment by detecting an area code embedded as a watermark on the duplicate and comparing it with an area code recorded on the reproduction apparatus.

THIRD EMBODIMENT

A third embodiment relates to embedding of reproduction quality information on a duplicate of a product recorded on a recording medium, and to restricting of image and sound quality of reproduction by designating a sampling frequency and a quantization bit rate at which the duplicate is to be reproduced.

The sampling frequency is the number of cycles per predetermined time period k1, k2, k3 (FIG. 16) necessary to sample a digital value when analog data is recovered from digital data. It is generally possible to recover an analog value having a signal spectrum with a maximum frequency of B(Hz) and below when the digital value is sampled at speeds of 2*B cycles/second or greater. This complies with Shannon's sampling theorem according to which an analog data signal can be recovered by sampling at speeds of 2*B cycles/second or greater when the maximum frequency of the signal spectrum of the analog data is B(Hz). Increasing (decreasing) the sampling frequency leads to increases (decreases) in the maximum frequency of the signal spectrum of the analog data being recovered.

Figure 16:
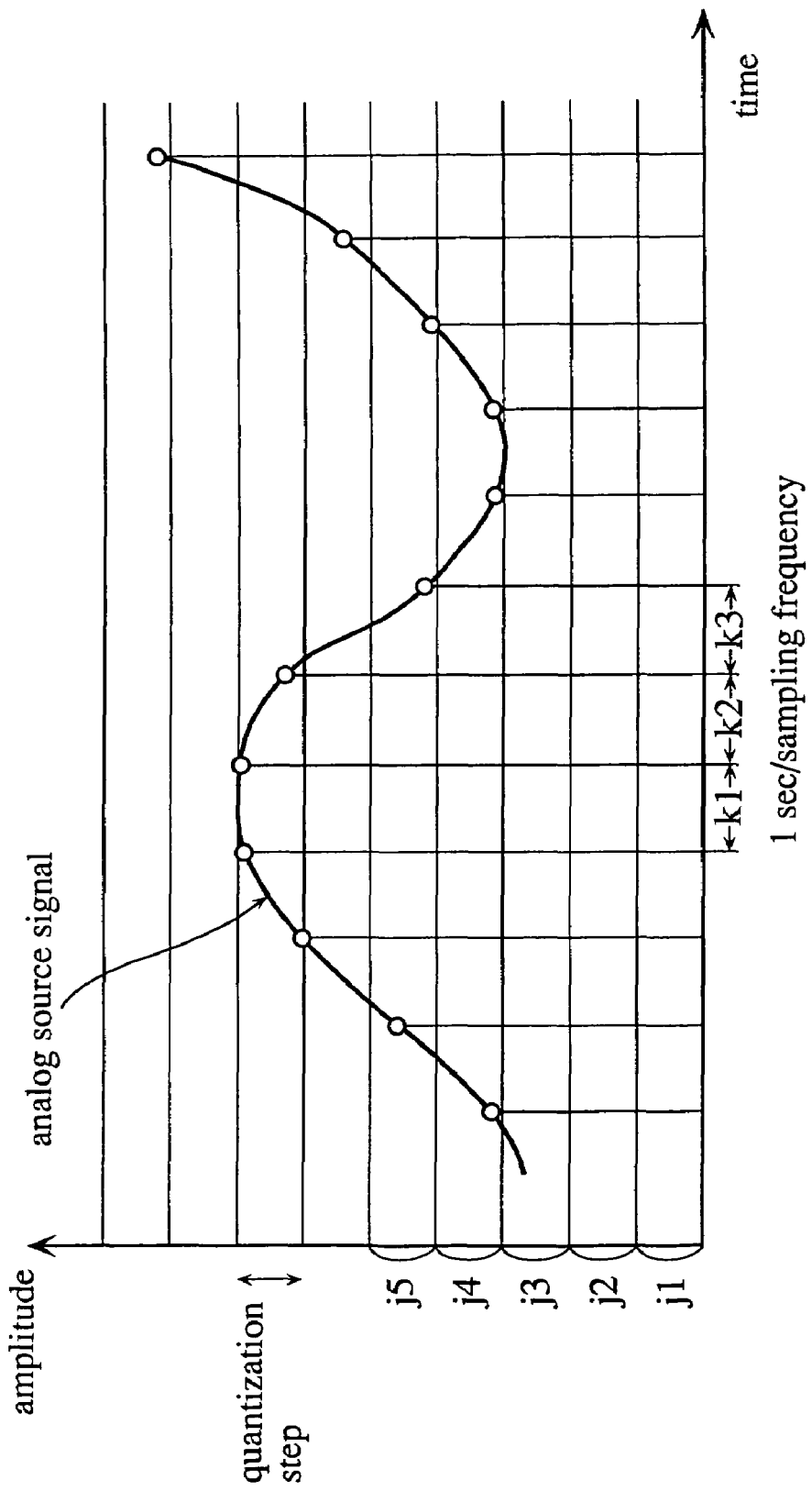
FIG. 16 shows an analog source signal when expressed as digital data.

The quantization bit rate is the bit number per quantization step gap j1, j2, j3, j4 . . . shown on the amplitude axis of FIG. 16. In FIG. 16, which shows an analog source signal when expressed as digital data, an amplitude of the digital value is divided into quantization step gaps which represent the quantization bit rate and which have been approximated to a quantization level closest to each sampling point.

FIG. 17 shows an example of quantization by rounding-off when a quantization bit rate of 8 and 9 bits is used. In FIG. 17 "0,1,2,3,4" and "0,1,2,3,4,5,6,7,8" are given as examples of a digital value when the quantization bit rate is 8 and 9 bits, respectively. As shown in FIG. 17, the quantization step number doubles and the quantization step gap decreases in size by half for every 1 bit increase in the quantization bit rate (i.e. from 8 to 9 bits), and the analog value is "3" and "7" when the quantization bit rate is 8 and 9 bits, respectively.

A comparison of a maximum quantization tolerance d1 and d2 for quantization bit rates of 8 and 9 bits, respectively, shows that the maximum quantization tolerance is reduced by half for a quantization bit rate of 9 bits. Since the maximum quantization tolerance is reduced by half for every 1 bit increase in the quantization bit rate, changes in this rate obviously affect the quality of the recovered analog data.

FIG. 18A shows an example of reproduction quality information for digital sound and image data, the reproduction quality information being composed of sampling frequency information and quantization bit rate information.

A sampling frequency (being 48, 96, 192, 44.1, 88.2, or 176.4 kHz) at which the duplicate will be reproduced by the reproduction apparatus is determined by sampling frequency information, which takes a value between 001–110. A quantization bit rate (being 16, 20, or 24 bits) at which the duplicate will be reproduced is determined by quantization bit rate information, which takes a value of 01, 10, or 11, respectively. The recording apparatus of the third embodiment will now be described.

An internal structure of the recording apparatus of the third embodiment is identical to that of the recording apparatus of the first embodiment (FIG. 4). In the third embodiment, the restrictions to be applied to the reproduction quality of the duplicate are determined by conducting the processing procedures of the recording control shown in the flowchart of FIG. 19.

Steps S601 to S603 in FIG. 19 correspond to the steps S501 to S503 shown in FIG. 12. In step S604 the data-type (i.e. image data, sound data) is identified and then a predetermined judging standard is used to determine the reproduction quality of the duplicate. In step S605, the CPU 107 instructs the watermark embedding unit 105 to embed the determined reproduction quality information as a watermark on the duplicate, and in step S606, the CPU 107 records the duplicate onto the disc 108.

FIGS. 18B and 18C show a comparison of the copy attribute both prior to and after, respectively, being changed by the watermark embedding unit 105 according to the third embodiment. As shown in FIG. 18B, when the detected copy attribute shows "10" (one generation copy), the watermark embedding unit 105 changes the "10" copy attribute into a copy attribute showing "11" (no more copy) and the new copy attribute is attached to medium ID information having a value of 011011011100 . . . 11001001101001 as per the first embodiment (FIGS. 7C and 7D). Sampling frequency information and quantization bit rate information of "010" and "01," respectively, have been additionally attached to the medium ID information that was given in FIG. 7D. Sampling frequency information of "010" indicates that the duplicate should be reproduced at a sampling cycle of 96 kHz, and quantization bit rate information of "01" indicates that the decoding should be conducted at a quantization bit rate of 16 bits.

Figure 20:
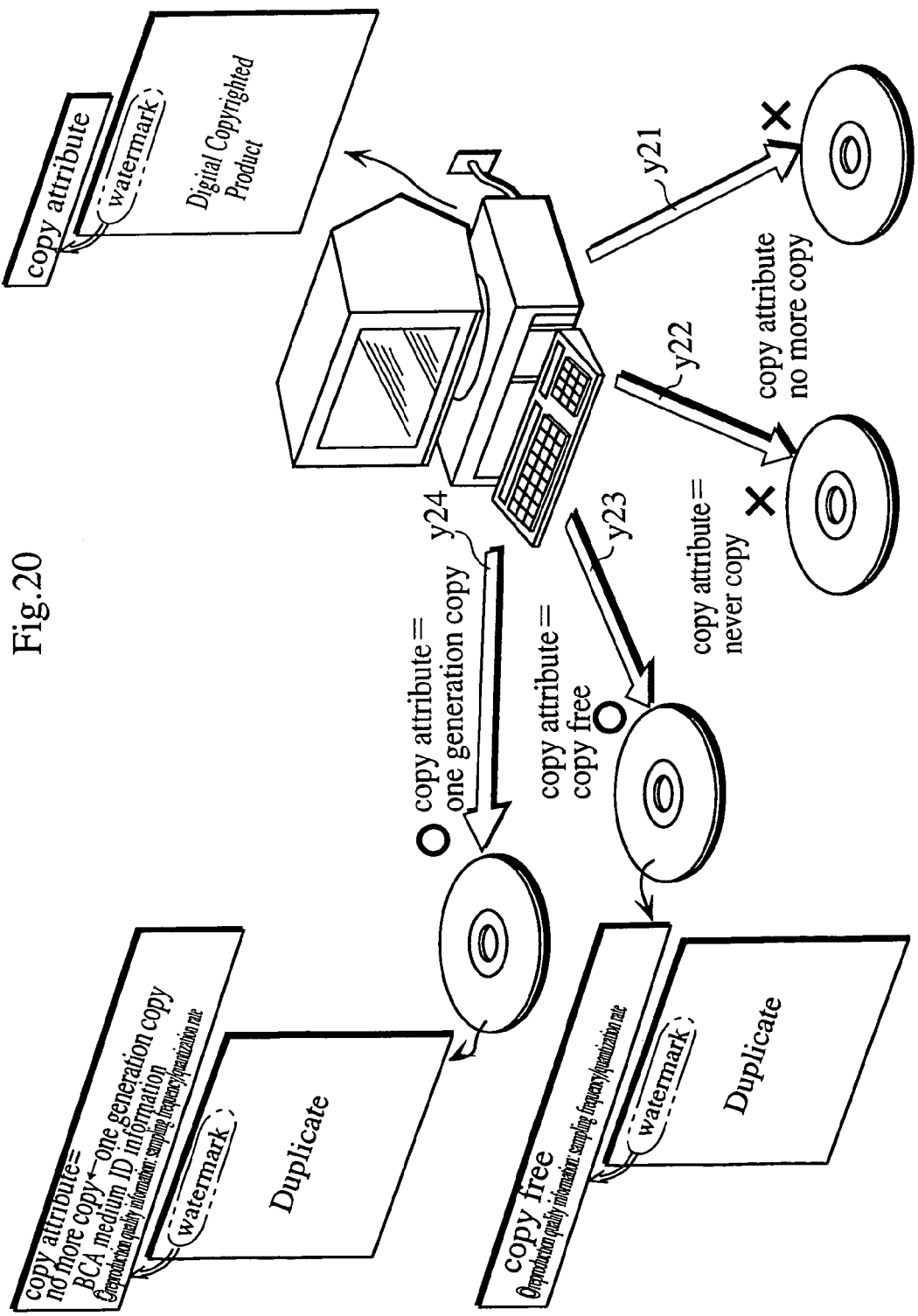
FIG. 20 shows a typical operation of the recording control employing a copy attribute of the third embodiment.

FIG. 20 shows a typical operation of a recording control employing a copy attribute of the third embodiment. As FIG. 20 is based on FIG. 6, only the differences will be described here.

When a copy attribute showing "one generation copy" (arrow y24) is embedded as a watermark on the product, the copy attribute is changed into a copy attribute showing "no more copy" and the new copy attribute is embedded on the duplicate together with the medium ID information read from the BCA of the disc. This process is the same as the first embodiment (FIG. 6), except that in the third embodiment reproduction quality information is embedded as an additional watermark on the duplicate. Reproduction quality information is also embedded as an additional watermark when the copy attribute recorded on the product shows "copy free" (arrow y23).

Figure 21:
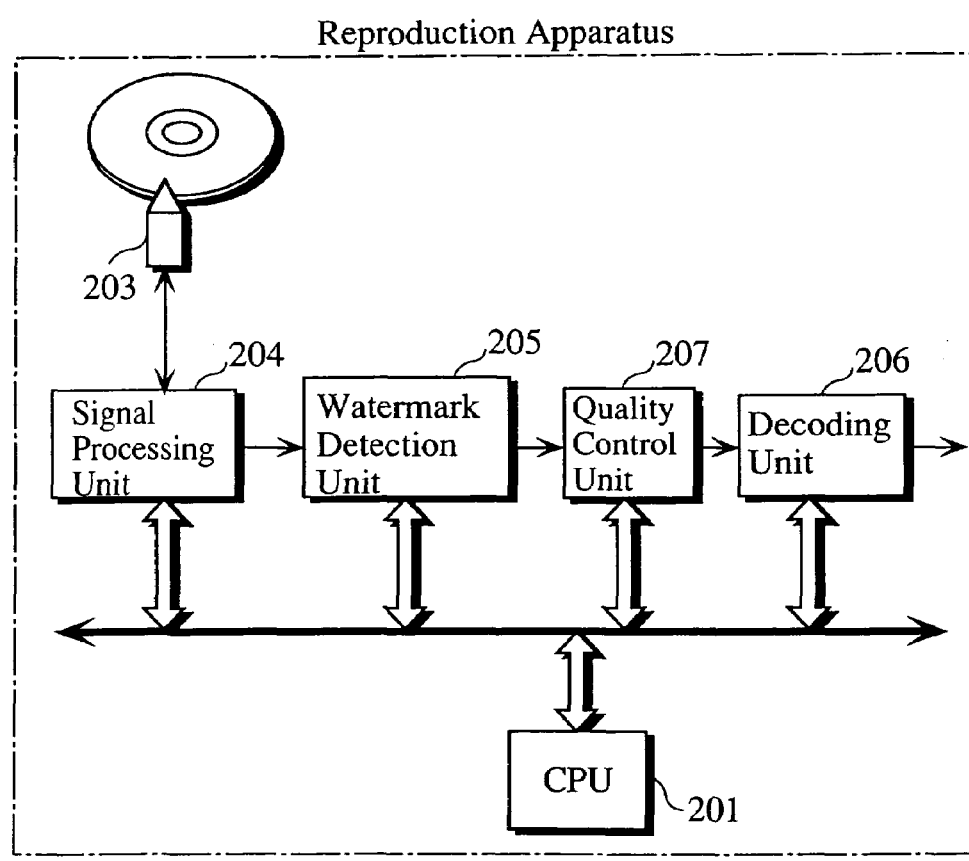
FIG. 21 shows an internal structure of the reproduction apparatus of the third embodiment.

The reproduction apparatus of the third embodiment will now be described with reference to FIG. 21, which shows an internal structure of the reproduction apparatus. Apart from a quality control unit 207, which has been additionally provided, the reference codes of the various units in FIG. 21 are the same as those in FIG. 8.

When a duplicate is output from the watermark detection unit 205, the quality control unit 207 instructs the decoding unit 206 to reproduce the duplicate at the sampling frequency and quantization bit rate shown in the reproduction quality information embedded as a watermark on the duplicate.

For example, if the duplicate is digital sound data quantized at a sampling frequency of 176.4 kHz and the reproduction quality information embedded as a watermark on the duplicate shows sampling frequency information of "010" (i.e. sampling frequency=96 kHz) then the quality control unit 207 instructs the decoding unit 206 to cut the sound component exceeding a sampling frequency of 96 kHz and to output the sound component having a sampling frequency of 96 kHz and below.

If the duplicate is digital sound data quantized at a quantization bit rate of 24 bits and the reproduction quality information shows a quantization bit rate information of "01" (i.e. quantization bit rate=16 bits), then the quality control unit 207 instructs the decoding unit 206 to decode the sound component up to 16 bits and to cut the remaining 8 bits of sound component.

Thus the reproduction control of the third embodiment restricts, in accordance with reproduction quality information embedded as a watermark on the duplicate, the reproduction quality of the duplicate reproduced by the reproduction apparatus. This process will now be described with reference to the flowchart in FIG. 22.

Figure 9:
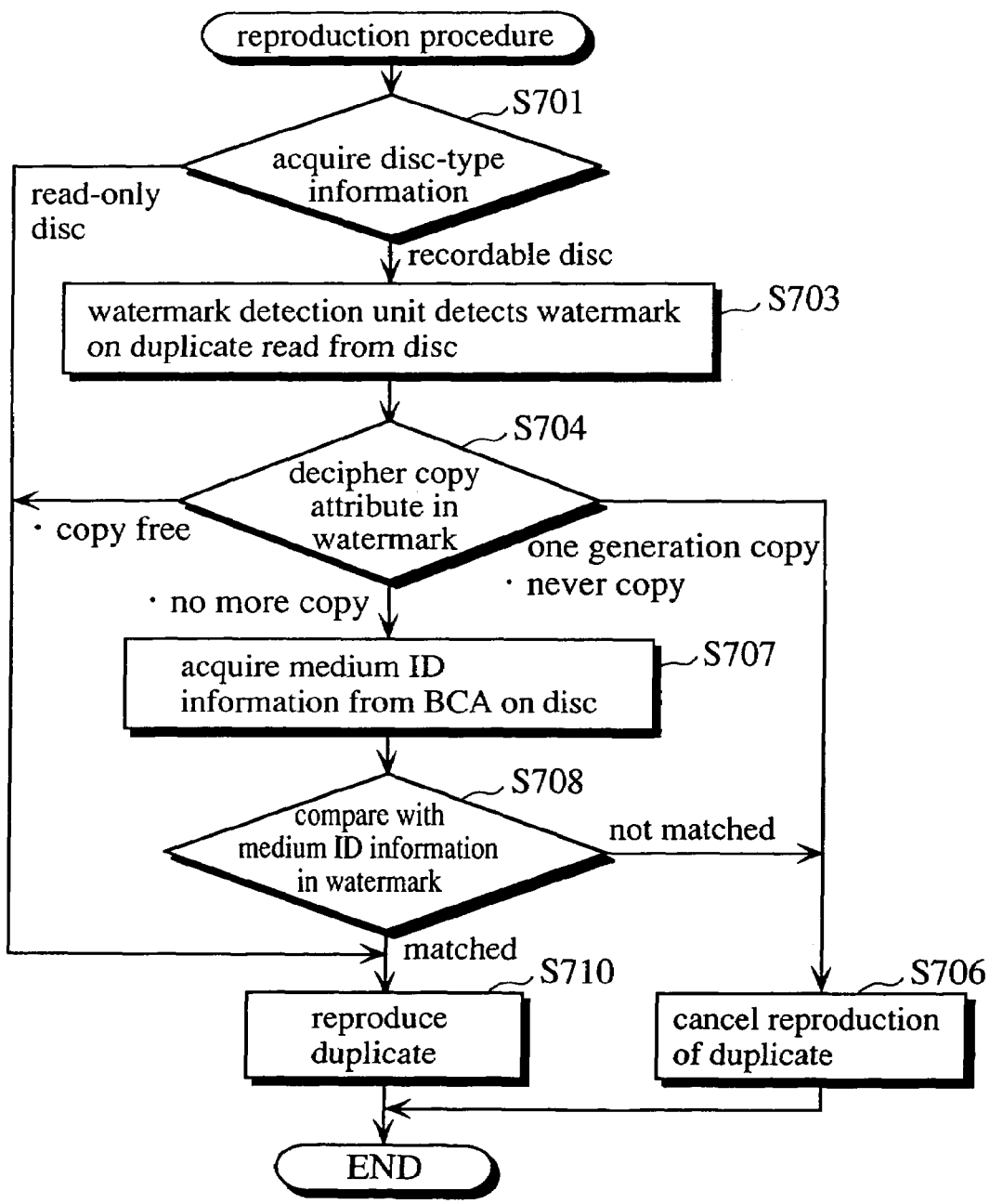
FIG. 9 is a flowchart showing the processing procedure of the reproduction control of the first embodiment.
Figure 22:
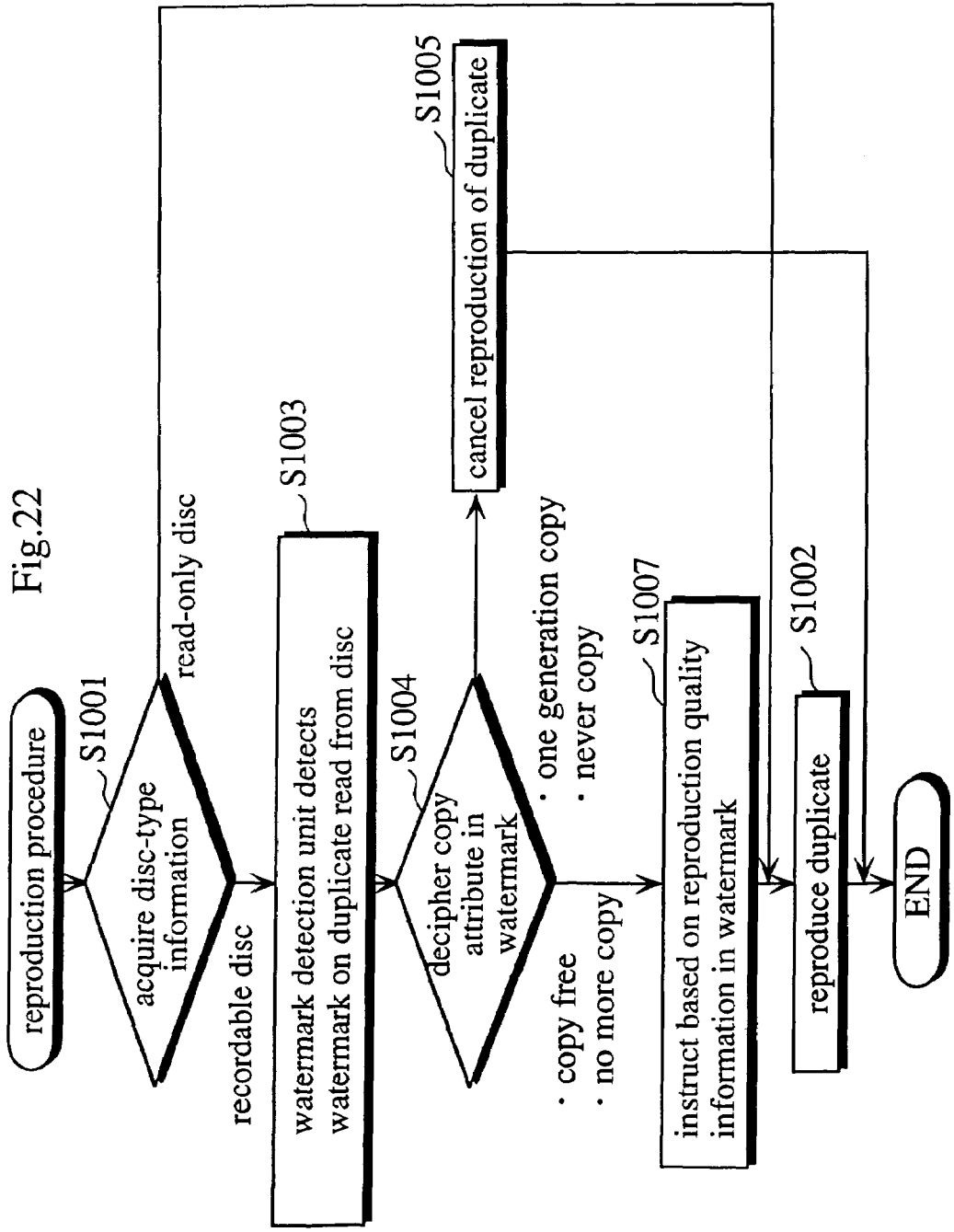
FIG. 22 shows a processing procedure of the reproduction control of the third embodiment.

Steps S1001, S1003 and S1004 in FIG. 22 are identical to steps S701, S703 and S710 in FIG. 9. If the disc 202 is judged to be a read-only disc (step S1001) then the CPU 201 conducts the reproduction unconditionally (step S1002), and if the disc is a recordable disc, the CPU 201 deciphers the copy attribute embedded on the disc 202 (step S1004). If a copy attribute showing "one generation copy" or "never copy" is detected, the reproduction of the duplicate is cancelled (step S1005). If the detected copy attribute is "copy free" or "no more copy," the CPU 201 instructs the quality control unit 207 to restrict the reproduction quality based on the reproduction quality information embedded as a watermark on the duplicate (step S1007), and the duplicate is reproduced at the restricted reproduction quality (step S1002).

The third embodiment as described above allows the product to be distinguished from a duplicate of the product by having the reproduction apparatus conduct the reproduction based on the embedded reproduction quality information.

The first, second, and third embodiments have been described above giving examples of the most favorable effects of each of the preferred embodiments. The present invention can, however, be altered in a manner that is not removed from the scope of the preferred embodiments. Specifically, the following variations (a), (b), (c), (d) and (e) are possible.

Variation (a)

Variation (a) can be realized by having execution programs perform the processing procedures shown in the flowcharts of FIGS. 5, 9, 12, 14, 19 and 22. The generated duplicate can be recorded onto a recording medium in this manner and then made available for distribution/sale. The recording medium can be an IC card, an optical disc, or a floppy disc, etc, and machine language programs recorded thereon can be installed for use on a personal computer. The personal computer can then operate the recording apparatus and the reproduction apparatus according to the preferred embodiments of the present invention by sequentially performing the installed execution programs.

Variation (b)

Figure 23:
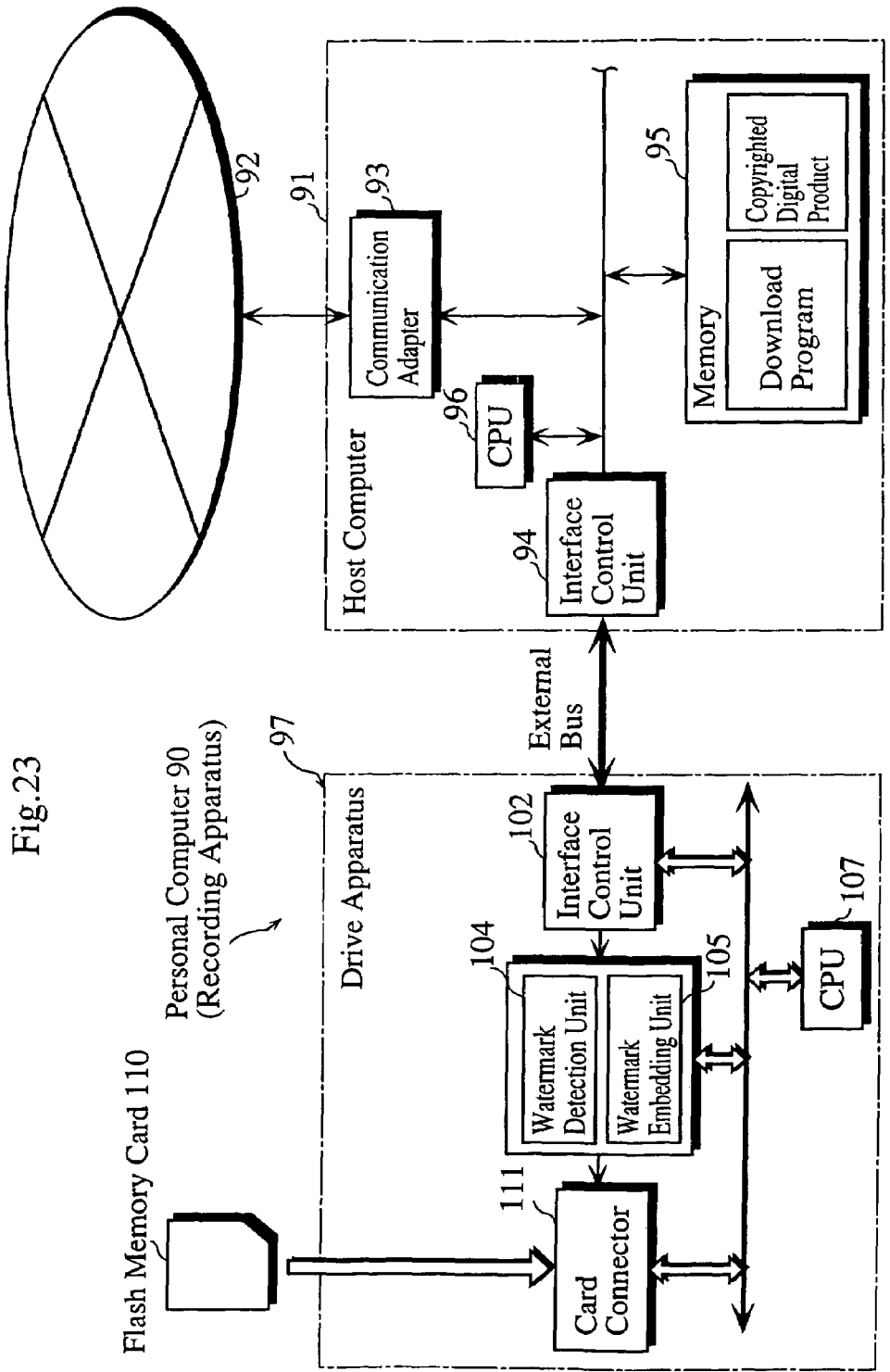
FIG. 23 shows an internal structure of the personal computer 90 used in a variation (b) of the first embodiment.

FIG. 23 shows an application of the first embodiment. A plurality of flash memory cards 110 and a card connector 11 in FIG. 23 replace, respectively, the disc 108 and the signal processing unit 101 in FIG. 4. Each flash memory card 110 includes a special area, an authentication area, and a user area.

The user area is managed by a file system and is an area on which hardware connected to the flash memory card 110 can freely write and read various kinds of data. The special area stores medium ID information, each flash memory card 110 having a unique set of ID information. The special area is a read-only area and the medium ID information is stored in an unalterable state on the special area. The authentication area is a rewritable area, although the read/write processes can only be performed when both the flash memory card 110 and the hardware connected to the flash memory card 110 have been authenticated.

When a duplicate of a product having a copy attribute showing "one generation copy" embedded thereon is recorded on the flash memory card 110, the medium ID information recorded on the special area of the flash memory card 110 is embedded as a watermark on the duplicate. The copyright of the product is thus protected in the manner disclosed by the first embodiment.

Variation (c)

FIG. 24 shows an internal construction of the personal computer 90 used in an application of the first embodiment. In variation (c) the communication adapter 93 and download program stored in the memory 95, both of which function to acquire the product from a public network, have been removed from the host computer 91. Instead, the product is stored in the memory 95 after being read from a read-only disc 112 loaded in the drive apparatus 97. As in the first embodiment, a copy attribute is embedded as a watermark on the product recorded on the read-only disc 112, and the host computer 91 performs the same processing procedures based on the embedded copy attribute as per the first embodiment. Thus variation (c) allows a duplicate of the product to be recorded on the disc 108, the product in this case being a package software product recorded on the read-only disc 112.

Variation (d)

If the product according to the third embodiment is digital image data, then it is desirable to include a filtering parameter in the reproduction quality information. The filtering parameter includes either a scan line number or a pixel number, thus making it possible to control the reproduction quality of the digital image data by interpolating the scan line number or the pixel number included in the reproduction quality information when the digital data is reproduced.

Variation (e)

According to the third embodiment as shown in FIG. 21 the quality control unit 207 is provided prior to the decoding unit 206. It is, however, possible to have the quality control unit 207 included within the decoding unit 206.

Variation (f)

The preferred embodiments disclose a process by which a copy attribute embedded as a watermark on a product is detected and then embedded as a watermark on a duplicate of the product when the duplicate is recorded onto a recording medium. It is, however, possible to detect a copy attribute that has been "attached" (rather than "embedded") to the product and then to attach the detected copy attribute to the duplicate when the duplicate is recorded onto the recording medium. The various forms of the attached copy attribute are described in variations (f-1), (f-2), and (f-3).

Variation (f-1)

A copy attribute specific to each of the generated duplicates can be housed in management information provided on a duplicate each time a duplicate is generated.

Variation (f-2)

When the duplicate is stored on a computer file, it is possible to store a copy attribute relating to the duplicate on a file having the same file name but different extension.

Variation (f-3)

When the duplicate is stored on a computer file, link information relating to the file storing the copy attribute can be provided, and the file can then be acquired by referring to the link information.

INDUSTRIAL APPLICABILITY

The present invention can be applied in the manufacture of (a) a recording apparatus for recording personal-use duplicates of a copyrighted original digital product and (b) a reproduction apparatus for reproducing the personal-use duplicates recorded by the recording apparatus. In particular, the present invention can be applied in the manufacture of audio-visual hardware and information hardware.

What is claimed is:

1. A recording apparatus for recording a duplicate of a product onto a recording medium, the product being a copyrighted digital product having a copy attribute embedded as a watermark thereon, comprising:
    an acquiring unit operable to acquire the copy attribute embedded on the product;
    a changing unit operable to change the acquired copy attribute into a copy attribute showing no more copy when the acquired copy attribute shows one generation copy;
    a reading unit operable to read from the recording medium at least a part of medium ID information recorded on the recording medium in an unalterable state; and
    a recording unit operable to record onto the recording medium the duplicate that has both the copy attribute showing no more copy and the read part of medium ID information embedded as a watermark thereon,
    wherein the read part of medium ID information is embedded as part of the watermark if the copy attribute is changed from one generation copy to no more copy.

2. The recording apparatus of claim 1, wherein the recording medium is an optical disc and the part of medium ID information read by the reading unit is information recorded on a burst cutting area of the optical disc.

3. The recording apparatus of claim 2, wherein the information recorded on the burst cutting area of the optical disc is a lot number assigned during a manufacture of the optical disc.

4. The recording apparatus of claim 1, further comprising:
    a storing unit operable to store one of (a) an area code of the recording apparatus, (b) an area code of a package media that recorded the product, and (c) an area code of a provider that supplied the product, wherein
    the stored area code is embedded, together with both the copy attribute and the part of medium ID information, as a watermark on the duplicate.

5. The recording apparatus of claim 1, further comprising:
    a generating unit operable to generate reproduction quality information showing restrictions relating to a reproduction quality of the duplicate, wherein
    the generated reproduction quality information is embedded, together with both the copy attribute and the part of medium ID information, as a watermark on the duplicate.

6. A computer-readable medium embodying a program for instructing a computer to record a duplicate of a product onto a recording medium, the product being a copyrighted digital product having a copy attribute embedded as a watermark thereon, and the program instructing the computer to perform a method comprising:
    acquiring the copy attribute embedded on the product;
    changing the acquired copy attribute into a copy attribute showing no more copy when the acquired copy attribute shows one generation copy;
    reading from the recording medium at least a part of medium ID information recorded on the recording medium in an unalterable state; and
    recording onto the recording medium the duplicate that has both the copy attribute showing no more copy and the read part of medium ID information embedded as a watermark thereon,
    wherein the read part of medium ID information is embedded as part of the watermark if the copy attribute is changed from one generation copy to no more copy.

7. The computer-readable medium of claim 6, wherein the recording medium is an optical disc, and the part of medium ID information read during said reading is information recorded on a burst cutting area of the optical disc.

8. The computer-readable medium of claim 7, wherein the information recorded on the burst cutting area of the optical disc is a lot number assigned during a manufacture of the optical disc.

9. The computer-readable medium of claim 6, the computer comprising:
    a storing unit operable to store one of (a) an area code of the recording apparatus, (b) an area code of a package media that recorded the product, and (c) an area code of a provider that supplied the product, wherein
    the stored area code is embedded, together with both the copy attribute and the part of medium ID information, as a watermark on the duplicate.

10. The computer-readable medium of claim 7, the program further instructing the computer to perform a method comprising:
    generating reproduction quality information showing restrictions relating to a reproduction quality of the duplicate, wherein
    the generated reproduction quality information is embedded, together with both the copy attribute and the part of medium ID information, as a watermark on the duplicate.

11. A recording method for recording a duplicate of a product onto a recording medium, the product being a copyrighted digital product having a copy attribute embedded as a watermark thereon, the method comprising:
  acquiring the copy attribute embedded on the product;
  changing the acquired copy attribute into a copy attribute showing no more copy when the acquired copy attribute shows one generation copy;
  reading from the recording medium at least a part of medium ID information recorded on the recording medium in an unalterable state; and
  recording onto the recording medium the duplicate that has both the copy attribute showing no more copy and the read part of medium ID information embedded as a watermark thereon,
  wherein the read part of medium ID information is embedded as part of the watermark if the copy attribute is changed from one generation copy to no more copy.

12. A recording apparatus for recording a duplicate of a product onto a recording medium, the product being a copyrighted digital product having a copy attribute attached thereon, comprising:

an acquiring unit operable to acquire the copy attribute embedded on the product;
  a changing unit operable to change the acquired copy attribute into a copy attribute showing no more copy when the acquired copy attribute shows one generation copy;
  a reading unit operable to read from the recording medium at least a part of medium ID information recorded on the recording medium in an unalterable state; and
  a recording unit operable to record onto the recording medium the duplicate that has both the copy attribute showing no more copy and the read part of medium ID information embedded as a watermark thereon,
  wherein the read part of medium ID information is embedded as part of the watermark if the copy attribute is changed from one generation copy to no more copy.

* * * * *

UNITED STATES PATENT AND TRADEMARK OFFICE
CERTIFICATE OF CORRECTION

PATENT NO. : 6,937,553 B1 Page 1 of 1
APPLICATION NO. : 09/914129
DATED : August 30, 2005
INVENTOR(S) : Yoshitaka Mitsui et al.

It is certified that error appears in the above-identified patent and that said Letters Patent is hereby corrected as shown below:

ON THE TITLE PAGE

In item [54], the title of the invention should read as follows:

--RECORDING APPARATUS, MEDIUM, AND METHOD FOR RECORDING A DUPLICATE OF A COPYRIGHTED DIGITAL PRODUCT THAT HAS A COPY ATTRIBUTE EMBEDDED AS A WATERMARK THEREON, AND REPRODUCTION APPARATUS AND METHOD FOR REPRODUCING THE DUPLICATE--.

In item [75], Inventors, "Yoshitaka Mitui" should read --Yoshitaka Mitsui--.

Signed and Sealed this

Twenty-fifth Day of July, 2006

JON W. DUDAS
*Director of the United States Patent and Trademark Office*